(12) United States Patent
Buxton et al.

(10) Patent No.: US 10,983,694 B2
(45) Date of Patent: Apr. 20, 2021

(54) DISAMBIGUATION OF KEYBOARD INPUT

(71) Applicant: Microsoft Technology Licensing, LLC, Redmond, WA (US)

(72) Inventors: William A. S. Buxton, Toronto (CA); Richard L. Hughes, Monroe, WA (US); Kenneth P. Hinckley, Redmond, WA (US); Michel Pahud, Kirkland, WA (US); Irina Spiridonova, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 201 days.

(21) Appl. No.: 15/903,481

(22) Filed: Feb. 23, 2018

(65) Prior Publication Data

US 2018/0300056 A1 Oct. 18, 2018

Related U.S. Application Data

(63) Continuation of application No. 14/485,720, filed on Sep. 13, 2014, now Pat. No. 9,940,016.

(51) Int. Cl.
*G06F 3/048* (2013.01)
*G06F 3/0488* (2013.01)
*G06F 3/023* (2006.01)
*G06F 3/0484* (2013.01)

(52) U.S. Cl.
CPC ........ *G06F 3/04886* (2013.01); *G06F 3/0233* (2013.01); *G06F 3/0234* (2013.01); *G06F 3/0236* (2013.01); *G06F 3/0237* (2013.01); *G06F 3/0488* (2013.01); *G06F 3/04842* (2013.01)

(58) Field of Classification Search
CPC ............... G06F 3/04886; G06F 3/0236; G06F 3/04842; G06F 3/0237; G06F 3/0233; G06F 3/0488
See application file for complete search history.

(56) References Cited

U.S. PATENT DOCUMENTS

| 5,953,541 | A | | 9/1999 | King et al. |
| 6,094,197 | A | * | 7/2000 | Buxton ............. G06F 3/0482 341/22 |
| 6,160,555 | A | | 12/2000 | Kang et al. |

(Continued)

FOREIGN PATENT DOCUMENTS

| CN | 102081490 A | 6/2011 |
| CN | 102117175 A | 7/2011 |

(Continued)

OTHER PUBLICATIONS

"Office Action Issued in Russian Patent Application No. 2017107513", dated Apr. 25, 2019, 6 pages.

(Continued)

*Primary Examiner* — Anil N Kumar
(74) *Attorney, Agent, or Firm* — Rainier Patents, P.S.

(57) ABSTRACT

An apparatus includes a keyboard engine that operates a keyboard that accepts shape-writing input and radial entry input. A keyboard input module obtains input data from at least one input sensor of the keyboard. An intention disambiguation engine enables simultaneous use of the shape-writing input and the radial entry input acceptance for a user of the keyboard.

20 Claims, 14 Drawing Sheets

(56) References Cited

U.S. PATENT DOCUMENTS

| | | | |
|---|---|---|---|
| 6,317,128 | B1 | 11/2001 | Harrison et al. |
| 6,424,338 | B1 | 7/2002 | Anderson |
| 6,707,449 | B2 | 3/2004 | Hinckley et al. |
| 7,202,857 | B2 | 4/2007 | Hinckley et al. |
| 7,453,439 | B1 | 11/2008 | Kushler et al. |
| 7,487,461 | B2 | 2/2009 | Zhai et al. |
| 7,706,616 | B2 | 4/2010 | Kristensson et al. |
| 8,059,101 | B2 | 11/2011 | Westerman et al. |
| 8,549,432 | B2 | 10/2013 | Warner |
| 2003/0014239 | A1 | 1/2003 | Ichbiah et al. |
| 2003/0107555 | A1 | 6/2003 | Williams |
| 2005/0190973 | A1 | 9/2005 | Kristensson et al. |
| 2006/0119582 | A1 | 6/2006 | Ng et al. |
| 2007/0005685 | A1 | 1/2007 | Chau et al. |
| 2007/0040813 | A1* | 2/2007 | Kushler .............. G06F 3/04883 345/173 |
| 2008/0010055 | A1 | 1/2008 | Pathiyal et al. |
| 2008/0270896 | A1* | 10/2008 | Kristensson ........ G06F 3/04883 715/261 |
| 2008/0316183 | A1 | 12/2008 | Westerman et al. |
| 2010/0259482 | A1 | 10/2010 | Ball |
| 2011/0122081 | A1 | 5/2011 | Kushler |
| 2011/0173558 | A1 | 7/2011 | Yeh et al. |
| 2011/0242138 | A1 | 10/2011 | Tribble |
| 2011/0302518 | A1 | 12/2011 | Zhang |
| 2012/0011462 | A1 | 1/2012 | Westerman et al. |
| 2012/0029910 | A1 | 2/2012 | Medlock et al. |
| 2012/0030606 | A1 | 2/2012 | Zhang |
| 2012/0030607 | A1 | 2/2012 | Michel et al. |
| 2012/0081290 | A1 | 4/2012 | Heo |
| 2012/0081316 | A1 | 4/2012 | Sirpal et al. |
| 2012/0127083 | A1 | 5/2012 | Kushler et al. |
| 2012/0154181 | A1 | 6/2012 | Rhee |
| 2012/0326984 | A1 | 12/2012 | Ghassabian |
| 2013/0046544 | A1 | 2/2013 | Kay et al. |
| 2013/0067420 | A1 | 3/2013 | Pittappilly et al. |
| 2013/0080963 | A1 | 3/2013 | Hong |
| 2013/0167019 | A1 | 6/2013 | Wadayama et al. |
| 2013/0176212 | A1 | 7/2013 | Nan et al. |
| 2013/0179781 | A1 | 7/2013 | Nan et al. |
| 2013/0201113 | A1 | 8/2013 | Hinckley et al. |
| 2013/0271385 | A1 | 10/2013 | Griffin et al. |
| 2014/0078063 | A1 | 3/2014 | Bathiche et al. |
| 2014/0123049 | A1 | 5/2014 | Buxton et al. |

FOREIGN PATENT DOCUMENTS

| | | |
|---|---|---|
| CN | 102841752 A | 12/2012 |
| JP | 2011221759 A | 11/2011 |
| RU | 2011123404 A | 12/2012 |
| WO | 2010018579 A2 | 2/2010 |
| WO | 2016040405 A1 | 3/2016 |

OTHER PUBLICATIONS

"Office Action Issued in European Patent Application No. 15766709.8", dated May 16, 2019, 4 Pages.
"International Preliminary Report on Patentability Issued in PCT Application No. PCT/US2015/04905", dated Nov. 18, 2016, 10 Pages.
"International Search Report & Written Opinion Received for PCT Application No. PCT/US2015/04905", dated Nov. 25, 2015, 12 Pages.
"Second Written Opinion Issued in PCT Application No. PCT/US2015/049056", dated Aug. 17, 2016, 9 Pages.
Piltch, Avram, "ASUS Eee Pad Slider SL 101 Review", Retrieved From: http://www.laptopmag.com/review/tablets/asus-eee-pad-slider-sl101.aspx, Sep. 22, 2011, 10 Pages.
Scheibel, et al., "Virtual Stick in Caret Positioning on Touch Screens", In Proceedings of the 25th Conference on Interaction Homme-Machine, Nov. 12, 2013, pp. 107-114.
Vertanen, et al., "A Versatile Dataset for Text Entry Evaluations Based on Genuine Mobile Emails", In Proceedings of the 13th International Conference on Human Computer Interaction with Mobile Devices and Services, Aug. 30, 2011, pp. 295-298.
Wobbrock, et al., "EdgeWrite: A Stylus-Based Text Entry Method Designed for High Accuracy and Stability of Motion", In Proceedings of the 16th Annual ACM Symposium on User Interface Software and Technology, Nov. 2, 2003, pp. 61-70.
Zhai, et al., "Foundational Issues in Touch-Surface Stroke Gesture Design—An Integrative Review", In Proceedings of Foundations and Trends® in Human-Computer Interaction, vol. 5, Issue 2, Dec. 12, 2012, pp. 97-205.
Zhai, et al., "Shorthand Writing on Stylus Keyboard", In Proceedings of the SIGCHI Conference on Human Factors in Computing Systems, Apr. 5, 2003, pp. 97-104.
"Office Action Issued in Japanese Patent Application No. 2017-511271", dated Jun. 7, 2019, 8 Pages.
"First Office Action and Search Report Issued in Chinese Patent Application No. 201580049268.7", dated Aug. 30, 2019, 16 Pages.
"Extremely Efficient Menu Selection: Marking Menus for the Flash Platform", Retrieved from: http://www.betriebsraum.de/blog/2009/12/11/extremely-efficient-menu-selection-marking-menus-for-the-flash-platform, Dec. 11, 2009, 9 Pages.
"Getting Started with Palm m500 Series Handhelds", Retrieved from: https://www.manualslib.com/download/116696/Palm-Handhelds-M500-Series.html, 2000, 19 Pages.
"Hot Virtual Keyboard", Retrieved from: https://web.archive.org/web/20081201161052/http://hot-virtual-keyboard.com:80/screenshots/, Dec. 1, 2008, 3 Pages.
"How to Use the iPad's Onscreen Keyboard", Retrieved From: http://www.dummies.com/how-to/content/how-to-use-the-ipads-onscreen-keyboard.html, Retrieved on: Nov. 27, 2018, 4 Pages.
"MessagEase, the Smart Choice for your Touch Screen Device", Retrieved from: www.exideas.com, Retrieved Date: Sep. 8, 2014, 3 Pages.
"On-Screen Keyboard for Windows 7, Vista, XP with Touchscreen", Retrieved From: http://web.archive.org/web/20170401090218/http://comfort-software.com/on-screen-keyboard.html, Retrieved Date: Apr. 1, 2017, 3 Pages.
"Swype", Retrieved from: http://web.archive.org/web/20121022115218/http://swypeinc.com/, Oct. 22, 2012, 1 Page.
"Final Office Action Issued in U.S. Appl. No. 13/720,527", dated Dec. 4, 2015, 28 Pages.
"Final Office Action Issued in U.S. Appl. No. 13/720,527", dated Dec. 14, 2016, 22 Pages.
"Non Final Office Action Issued in U.S. Appl. No. 13/720,527", dated Jun. 1, 2016, 21 Pages.
"Non Final Office Action Issued in U.S. Appl. No. 13/720,527", dated Apr. 13, 2017, 23 Pages.
"Non Final Office Action Issued in U.S. Appl. No. 13/720,527", dated May 20, 2015, 27 Pages.
"Final Office Action Issued in U.S. Appl. No. 14/485,720", dated Mar. 20, 2017, 16 Pages.
"Non Final Office Action Issued in U.S. Appl. No. 14/485,720", dated Dec. 1, 2016, 16 Pages.
"Office Action Issued in European Application No. 15766709.8", dated Oct. 9, 2018, 10 Pages.
Zhai, et al., "The Word-Gesture Keyboard: Reimagining Keyboard Interaction", In Communications of the ACM, vol. 55, Issue 9, Sep. 1, 2012, pp. 91-101.
Arif, et al., "Analysis of Text Entry Performance Metrics", In IEEE Toronto International Conference on Science and Technology for Humanity, Sep. 26, 2009, pp. 100-105.
Arif, et al., "Experimental Study of Stroke Shortcuts for a Touch-screen Keyboard with Gesture-Redundant keys removed", In the Proceedings of Graphics Interface, Canadian Information Processing Society, May 7, 2014, pp. 13-50.
Arif, et al., "Predicting the Cost of Error Correction in Character-Based Text Entry Technologies", In Proceedings of the SIGCHI Conference on Human Factors in Computing Systems, Apr. 10, 2010, pp. 5-14.
Bragdon, et al., "GestureBar: Improving the Approachability of Gesture-Based Interfaces", In Proceedings of the SIGCHI Conference on Human Factors in Computing Systems, Apr. 4, 2009, pp. 2269-2278.

(56) References Cited

OTHER PUBLICATIONS

Buxton, Bill, "Too Hidden Features of the Windows Ce Graphical Keyboard", Retrieved from: http://www.billbuxton.com/Windows%20CE%20Graphical%20Keyboard.pdf, Apr. 15, 2013, 9 Pages.

Costagliola, et al., "TypeJump: A Typing Game for KeyScretch", In IEEE Symposium on Visual Languages and Human-Centric Computing, Sep. 30, 2012, pp. 241-242.

Dillon, et al., "Measuring the True Cost of Command Selection: Techniques and Results", In Proceedings of the SIGCHI Conference on Human Factors in Computing Systems, Mar. 1, 1990, pp. 19-25.

Findlater, et al., "Beyond Qwerty: Augmenting Touch Screen Keyboards with Multi-Touch Gestures for Non-Alphanumeric Input", In Proceedings of the SIGCHI Conference on Human Factors in Computing Systems, May 5, 2012, pp. 2679-2682.

Findlater, et al., "Typing on Flat Glass: Examining Ten-Finger Expert Typing Patterns on Touch Surfaces", In Proceedings of the International Conference on Human Factors in Computing Systems, May 7, 2011, pp. 2453-2462.

Fuccella, et al., "Gestures and Widgets: Performance in Text Editing on Multi-Touch Capable Mobile Devices", In Proceedings of the SIGCHI Conference on Human Factors in Computing Systems, Apr. 27, 2013, pp. 2785-2794.

Goldberg, et al., "Touch-Typing with a Stylus", In Proceedings of the INTERACT '93 and CHI '93 Conference on Human Factors in Computing Systems, Apr. 24, 1993, pp. 80-87.

Grossman, et al., "Strategies for Accelerating on-Line Learning of Hotkeys", In Proceedings of the SIGCHI Conference on Human Factors in Computing Systems, Apr. 28, 2007, pp. 1591-1600.

Harrison, et al., "Transparent Layered User Interfaces: An Evaluation of a Display Design to Enhance Focused and Divided Attention", In Proceedings of the SIGCHI Conference on Human Factors in Computing Systems, May 1, 1995, pp. 317-324.

Hashimoto, et al., "A virtual Oval Keyboard and a Vector Input Method for Pen-Based Character Input", In Conference Companion on Human Factors in Computing Systems, May 7, 1995, pp. 254-255.

Hinckley, et al., "New Applications for the Touchscreen in 2D and 3D Medical Imaging Workstations", In Medical Imaging 1995: Image Display, vol. 2431, Feb. 1995, pp. 561-571.

Isokoski, Poika, "Performance of Menu-Augmented Soft Keyboards", In Proceedings of the SIGCHI Conference on Human factors in computing systems, Apr. 25, 2004, pp. 423-430.

Kristensson, et al., "SHARK 2: A Large Vocabulary Shorthand Writing System for Pen-Based Computers", In Proceedings of the 17th annual ACM symposium on User Interface Software and Technology, Oct. 24, 2004, pp. 43-52.

Kurtenbach, et al., "An Empirical Evaluation of Some Articulatory and Cognitive Aspects of Marking Menus", In Journal of Human-Computer Interaction, vol. 8, Issue 1, Mar. 1, 1993, 23 Pages.pp. 1-23.

Kurtenbach, G., et al., "Contextual Animation of Gestural Commands", In Journal Computer Graphics Forum, vol. 13, Issue 5, Dec. 1994, pp. 305-314.

Kurtenbach, G., et al., "GEdit: A Test Bed for Editing by Contiguous Gestures", In ACM SIGCHI Bulletin, vol. 23, Issue 2, Apr. 1991, pp. 22-26.

Kurtenbach, et al., "Issues in Combining Marking and Direct Manipulation Techniques", In Proceedings of the 4th Annual ACM Symposium on User Interface Software and Technology, Nov. 11, 1991, pp. 137-144.

Kurtenbach, et al., "The Design of a GUI Paradigm Based on Tablets, Two-hands, and Transparency", In the Proceedings of the ACM SIGCHI Conference on Human factors in computing systems, Mar. 27, 1997, pp. 35-42.

Kurtenbach, G., et al., "The Limits of Expert Performance Using Hierarchic Marking Menus", In Proceedings of the INTERACT and CHI Conference on Human Factors in Computing Systems, May 1, 1993, pp. 482-487.

Kurtenbach, G., et al., "User Learning and Performance with Marking Menus", In Proceedings of the SIGCHI Conference on Human Factors in Computing Systems, Apr. 24, 1994, pp. 258-265.

Li, et al., "The 1 Line Keyboard: A QWERTY Layout in a Single Line", In Proceedings of the 24th Annual ACM Symposium on User Interface Software and Technology, Oct. 16, 2011, pp. 461-470.

MacKenzie, et al., "Phrase Sets for Evaluating Text Entry Techniques", In Proceedings of CHI'03 Extended Abstracts on Human Factors in Computing Systems, Apr. 5, 2003, pp. 754-755.

MacKenzie, et al., "Text Entry Using Soft Keyboards", In Behaviour & Information Technology, vol. 18, Issue 4, 1999, pp. 235-244.

MacKenzie, et al., "The Design and Evaluation of a High-Performance Soft Keyboard", In Proceedings of the SIGCHI conference on Human Factors in Computing Systems, May 1, 1999, pp. 25-31.

MacKenzie, et al., "The Immediate Usability of Graffiti", In Proceedings of the Conference on Graphics Interface, May 21, 1997, pp. 129-137.

MacKenzie, et al., "Unipad: Single Stroke Text Entry with Language-Based Acceleration", In Proceedings of the 4th Nordic Conference on Human-Computer Interaction: Changing Roles, Oct. 14, 2006, pp. 78-85.

Martin, Benoit, "VirHKey: A Virtual Hyperbolic Keyboard with Gesture Interaction and Visual Feedback for Mobile Devices", In Proceedings of the ACM 7th international conference on Human computer interaction with mobile devices & services, Sep. 19, 2005, pp. 99-106.

Matsui, Toshiyuki, "An Efficient Text Input Method for Pen-based Computers", In Proceedings of the SIGCHI conference on Human factors in computing systems, Apr. 18, 1998, pp. 328-335.

Zhai, et al., "The Metropolis Keyboard—An Exploration of Quantitative Techniques for Virtual Keyboard Design", In Proceedings of the 13th annual ACM Symposium on User interface Software and Technology, Nov. 1, 2000, pp. 119-128.

"PCT Search Report and Witten Opinion Issued in PCT Application No. PCT/US2013/066474", dated Mar. 6, 2014, 8 Pages.

"Office Action Issued in Australian Patent Application No. 2015315248", dated Apr. 3, 2020, 3 Pages.

"Office Action Issued in Brazilian Patent Application No. 112017003650-9", dated May 7, 2020, 5 Pages.

"Office Action Issued in Mexican Patent Application No. MX/a/2017/003316", dated Jul. 24, 2020, 6 Pages.

"Extended European Search Report Issued in European Application No. 20162862.5", dated Jun. 10, 2020, 11 Pages.

* cited by examiner

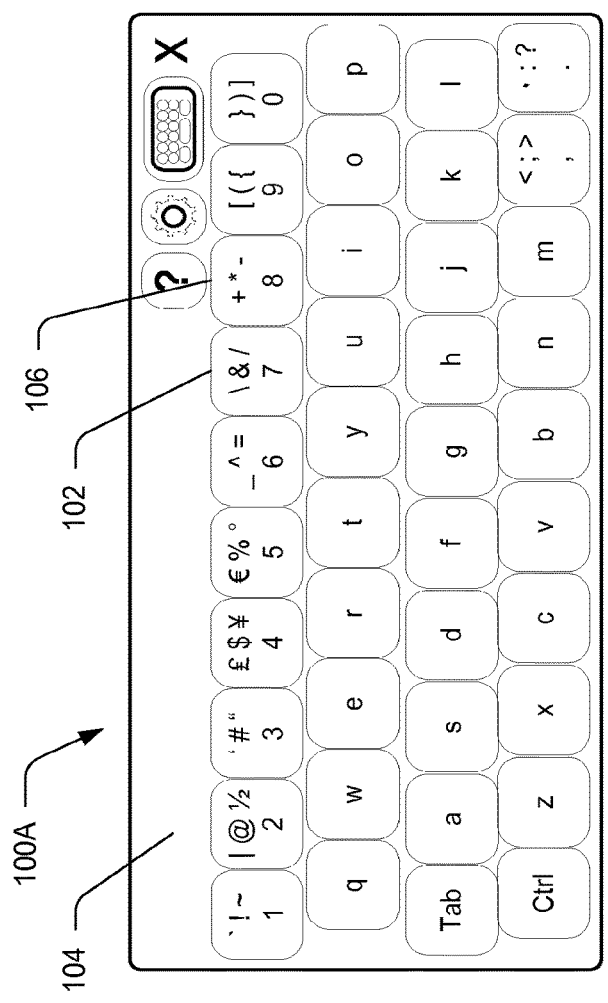
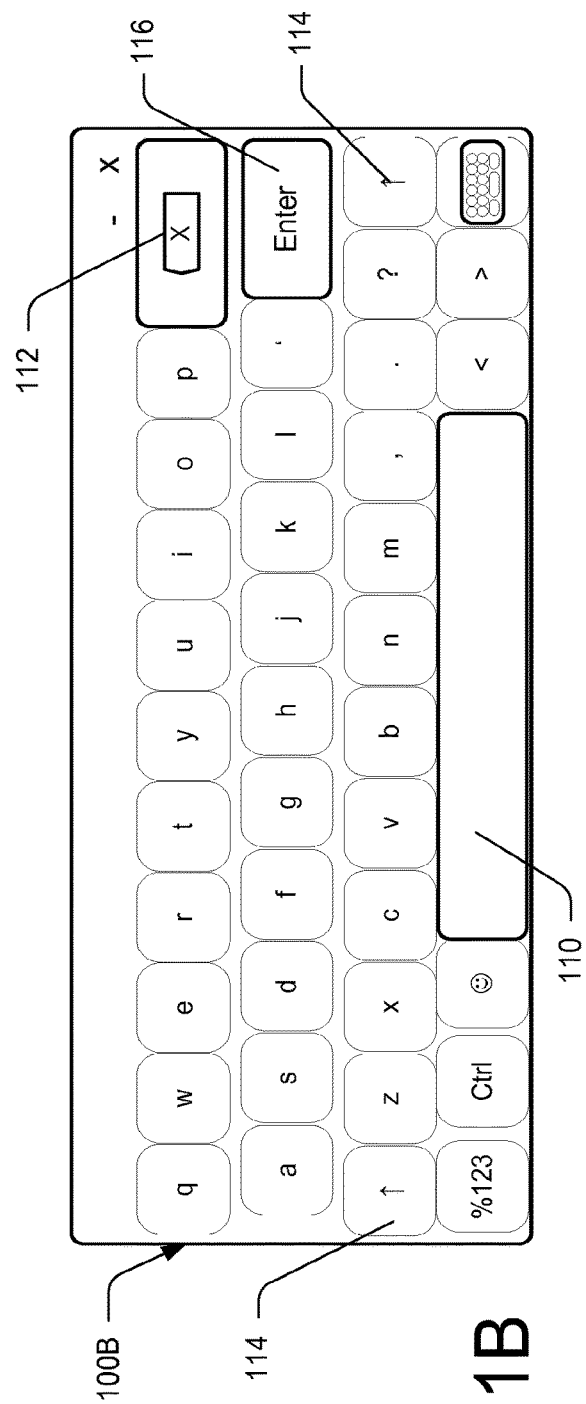
FIG. 1A
FIG. 1B

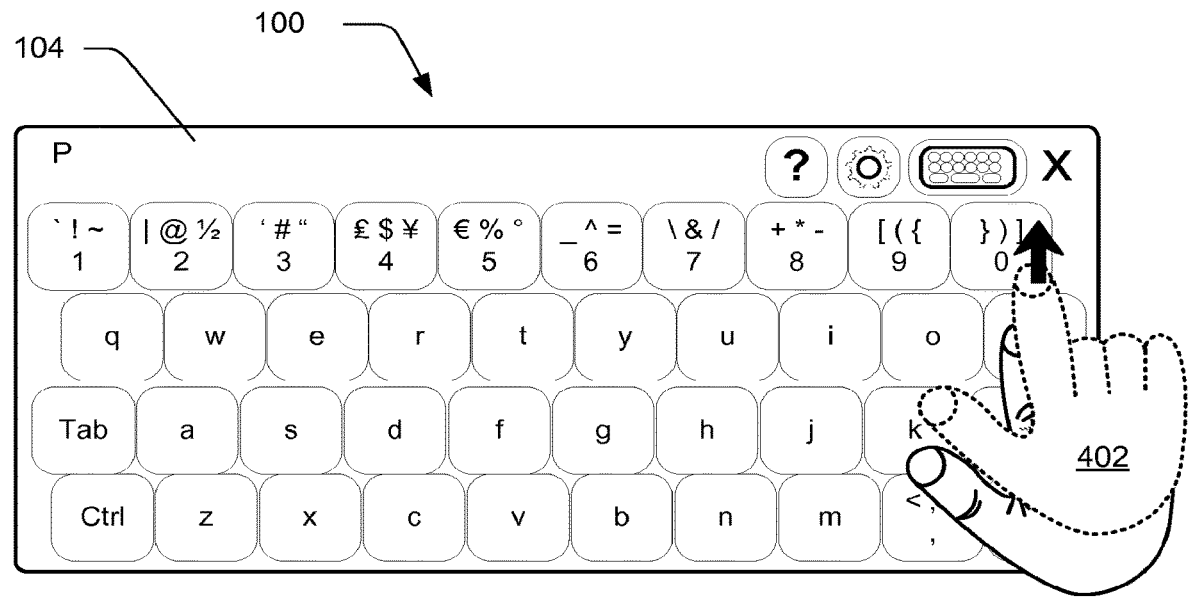
FIG. 4
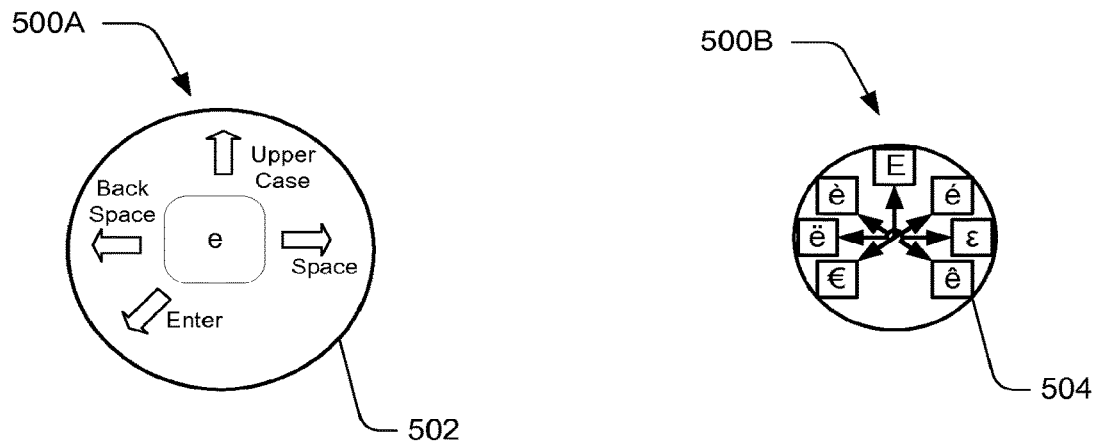
FIG. 5A
FIG. 5B

DISAMBIGUATION OF KEYBOARD INPUT

BACKGROUND

Users of electronic devices are increasingly using mobile devices and tablets, which has led to an increased usage of graphical touchscreen keyboards and other touch-sensitive keyboards, and a corresponding user demand for efficient text entry techniques. Researchers have pursued many strategies to improve touchscreen typing, from non-QWERTY key layouts, to shape-writing entire words in a single stroke, to approaches that heavily multiplex keys and resolve ambiguous inputs through language models.

While such techniques may yield substantial performance advantages, they may also often involve a substantial investment of skill acquisition from users before performance gains may be realized. Thus, users may not maintain an interest in such new techniques long enough to realize such gains.

SUMMARY

According to one general aspect, an apparatus includes a keyboard engine that operates a keyboard that accepts shape-writing input and radial entry input. A keyboard input module obtains input data from at least one input sensor of the keyboard. An intention disambiguation engine enables simultaneous use of the shape-writing input and the radial entry input acceptance for a user of the keyboard.

According to another aspect, input data may be obtained from a keyboard that accepts shape-writing input and radial entry input. Simultaneous use of the shape-writing input and the radial entry input acceptance may be provided for a user of the keyboard, by disambiguating the input data to distinguish between the shape-writing input and the radial entry input.

According to another aspect, a computer program product may include a computer-readable storage medium storing executable code that may cause at least one device processor to obtain input data from a keyboard that accepts shape-writing input and radial entry input, and provide simultaneous use of the shape-writing input and the radial entry input acceptance for a user of the keyboard, by disambiguating the input data to distinguish between the shape-writing input and the radial entry input.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

FIGS. 1A-1B illustrate example virtual keyboards.

FIG. 4 illustrates an example of a vertical radial entry gesture.

FIGS. 5A-5B illustrate example radial menus.

DETAILED DESCRIPTION

I. Introduction

Figure 2:
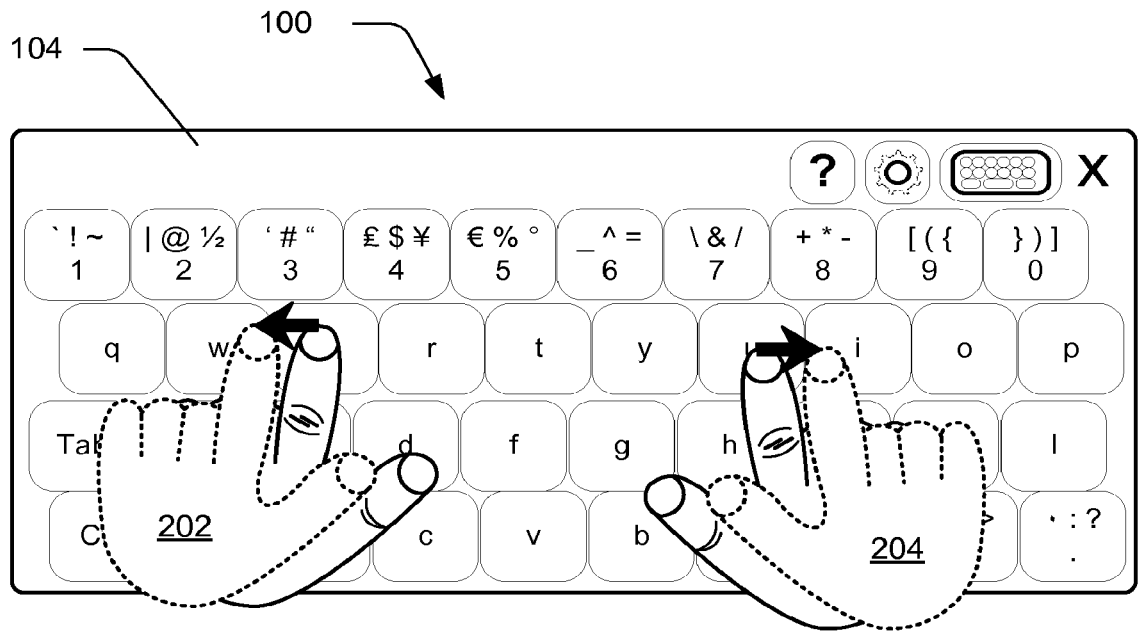
FIG. 2 illustrates an example of lateral radial entry gestures.

Enhancements and innovations for soft-keyboards for text entry on slates, tablets, mobile phones, and multi-touch electronic whiteboards is currently an active area of research and innovation.

One technique for improving text entry performance, or for fitting more key functions in the same screen real estate, is to augment touchscreen keyboards with single or multi-touch swipe gestures. For example, stroke shortcuts, for keys such as Space, Backspace, Enter, and Shift may be employed in this manner, as radial gestures (i.e., directional strokes triggered at various locations on, near, or between the keys of a virtual keyboard; or, in some implementations, directly above the text itself), or via radial menus that can be invoked on specific keys (e.g. for Shift), or on almost any area of the keyboard (e.g., for Space, Backspace, and Enter). In particular, this approach also enables the potential removal, or omission, of the corresponding keys made redundant by the gestures, hence freeing up keyboard space for additional characters from potential secondary and tertiary virtual keyboards. As an example, some techniques for providing stroke keyboards with radial menus and with gesture-redundant keys omitted are discussed in commonly owned U.S. Provisional Patent Application Ser. No. 61/720, 335, filed Oct. 30, 2012, entitled "Graphical Keyboard with Radial Menus," and U.S. patent application Ser. No. 13/720, 527, published as U.S. Patent Application Publication No. 2014/0123049, filed Dec. 19, 2012, entitled, "Keyboard with Gesture-Redundant Keys Removed."

Further, such key functions may be implemented via example stroke or short-stroke gestures. As an example, some techniques for providing such key functions are discussed in commonly owned U.S. patent application Ser. No. 13/712,111, filed Dec. 12, 2012, published as U.S. Patent Application Publication No. 2014/0078063, entitled "Gesture-Initiated Keyboard Functions."

In accordance with example techniques discussed herein, a keyboard may provide a combination of short linear-stroke gestures—for example, radial strokes, radial entry mode gestures, or radial menu gestures—with shape-writing. In accordance with example techniques discussed herein, any of the allowed entry modes may be used anywhere on the keyboard, and disambiguating between modes may be accomplished seamlessly, on-the-fly, at any location on the keyboard that is configured to receive input from a user.

In this context, "gesture" may refer to any touching, sliding, holding, or releasing of the finger or other keyboard entry object (or any combination or subcombination thereof) against or from the touch-sensitive surface of the keyboard device. Further, "gesture" may refer to any movements, of fingers, hands, or other keyboard entry objects (or any combination or subcombination thereof), that occur over the keyboard, without touching it (e.g., in the air-space above the keyboard, whether that be a physical keyboard or a soft keyboard, or with regard to a virtual keyboard). Further, "gesture" may refer to any movements, of fingers, hands, or other keyboard entry objects, that begin on the display and go up above the display as the input object moves (e.g., with a depth sensitive display, radial menu gestures may begin on the display and move up above the display as a finger performs the gesture, and thus can be distinguished from a gesture in the same direction where the finger stays in contact with the display).

As used in this context, "shape writing" on a keyboard may involve stroking on top of the keyboard to spell out words without lifting a finger. For example, shape writing may be interpreted by determining various keys that are proximal to the gesture based on the shape of a stroke and inflection points of a stroke (e.g., determining which key is sufficiently close to an inflection point, based on a predetermined threshold value of "closeness" —to determine that this "sufficiently close" key was intended for entry as input). For example, such gestures may be used for entry of a whole word, in shape writing. For example, a language model may be used to match the stroke path to the intended word.

For example, shape gestures may be used for frequently used words (e.g., "the," "of", or other words used frequently by a particular user)—and may advantageously provide greater speed and efficiency in text entry, when the user learns the shape gestures. For example, shape gestures may be used for infrequent words as well (i.e., for any word that is in the dictionary). For example, as users gain experience with the shape-writing techniques, they may exhibit a tendency to shape-write more and more infrequently-occurring words.

As used in this context, a "radial stroke" or "radial entry" gesture may generally refer to substantially short, linear (i.e., substantially straight, with substantially no inflection points, or non-linear angles included in the gesture) strokes or gestures that are executed by movement in a particular direction (e.g., up, down, left, right, etc. when a device is held in its normal use position) following an initial touch.

As used in this context, a "radial stroke" or "radial entry" gesture may also refer to longer strokes. For example, such longer strokes may be used in radial menus (e.g., long, straight, vertical strokes interpreted as a repeating backspace gesture).

As used in this context, a "radial stroke" or "radial entry" gesture may also refer to strokes with one inflection point (e.g., to allow hierarchical (nested) radial menus).

As used in this context, "intent" may refer to an intent of a user in keyboard entry. For example, a user may intend to enter the word "we" as he/she gestures continuously from a "w" key to an "e" key on a keyboard. As used in this context, "intention disambiguation" may refer to disambiguation of potential intended representations of inputs as entered on a keyboard, and as intended by an entity (e.g., a user) that provides the keyboard entry input.

In accordance with example techniques discussed herein, a keyboard may include integration of simple stroke shortcuts for the example keys (e.g., keys that are redundant with stroke shortcuts, and thus may be omitted from a keyboard that supports stroke shortcuts) and/or functions discussed above, and other gestures, while simultaneously supporting "shape writing" techniques. For example, this integration may enable a hybrid approach that combines the simple performance advantages of example stroke gestures with the longer-term acquisition of full shape-writing skills, which (while offering a higher ceiling of performance) may involve greater investment of practice and learning of the user to fully benefit from them.

FIG. 1A illustrates an example tap-plus-gesture QWERTY graphical or printed keyboard 100A with omitted Space, Backspace, Shift and Enter keys. For example, an alternative to actual complete omission/elimination is to have one or more keys significantly reduced in size and/or combined onto a single key, that is, substantial omission of those keys. Likewise, this may refer to a standard keyboard (with all keys being available as on tab or option, and a keyboard with some or all of these keys omitted being another tab or option, per user preference. In this context, "remove" and its variants such as "omit", "removal" or "removing" refer to actual omission (or substantial omission.)

As can be seen, via the omission, numerical/special characters may be substituted, e.g., the top row of the standard QWERTY keyboard (the digits one through nine and zero, as well as the shifted characters above them) is provided in the space freed up by omission of the redundant keys. For example, the "7" key 102 is shown as having radial entry alternatives "\", "&", and "/", as available via radial strokes up-left, up, and up-right, respectively. For example, a tap on the "7" key 102 will provide an inference that the user intends to enter a "7." However, a touch on the "7" key 102, followed by a short stroke (substantially linear, substantially short gesture) up, and in a left-moving direction (up and to the left, from a user perspective) may provide an inference that the user intends to enter a "\" as a radial entry gesture (i.e., a radial entry stroke). For example, these additional characters per key may be located on the key such that a corresponding gesture may be naturally intuitive (e.g., "\" input involving a gesture up and to the left, from a user perspective, and "/"input involving a gesture up and to the right, from a user perspective). Additionally, the "9" key and "0" keys respectively include braces, parentheses, and brackets, such that a stroke to open one pair (on the "9" key) is intuitively coupled with and oppositional type of stroke or gesture to close the pair (on the "0" key), for intuitive ease in radial-entry input.

As shown in FIG. 1A, in the example keyboard 100A, up to three, rather than one, auxiliary characters (including symbols and commands, etc) may be added to the basic keys of a keyboard, resulting in up to four characters per key, as radial menu gestures or strokes. Thus, for example, the three upward strokes, Up-Left, Up, and Up-Right may be used to distinguish among which of the three auxiliary characters is selected. The Up character (e.g., the asterisk "*") may be the character normally coupled with the associated primary character (e.g., lower-case, for letters) on standard QWERTY keyboards, and is displayed as positioned between the other two stroke-selected characters. Hence, the general direction of the upward stroke corresponds to the position of the character selected, (with Up-Left stroke selecting the left stroke-shifted character plus "+" for the "8" key 106, and Up-Right the right stroke-shifted character minus "−"). In other implementations, there may be more (or fewer) gestures per key (thus having more (or fewer) characters and/or commands per key), and/or more gestures that can be initiated anywhere on the keyboard. Thus, switching to a secondary keyboard to enable these additional inputs may be substantially reduced (or eliminated).

For example, the additional characters per key may be visually grayed out (or other visual aid to de-emphasize the additional characters in visibility) to enable easier readability perception for the user in typing. For example, the visible keyboard may have a black (or similarly dark) background color with white (or similarly lighter) character imprints on the keys. Thus, the additional characters may appear on the displayed keyboard as less emphasized than the "base" key character, to aid in visibility "separation" for the user.

For example, employing the auxiliary and primary symbols of the added keys (as shown) moves characters to the primary keyboard from a secondary one. For example, other characters that appear on a typical QWERTY keyboard may also appear on the top and bottom right. By omitting the Space, Enter, Shift and Backspace keys, this keyboard may provide far more characters while consuming the same touch-sensitive surface area and having the same size of keys (or different sizes of keys), for example, as other keyboards with far fewer characters. The immediate access to those common characters that this mechanism provides enables a significant increase in text entry speed, and reduces complexity.

As shown in FIG. 1A, a display area for an alternative suggestions list 104 may be provided for display of alternatives in context (e.g., word alternatives, gesture alternatives, etc.) as user input is being entered on the keyboard 100A. For example, suggestions may be provided as the user enters input. For example, the user may select an alternative from the list, which may further include a selectable "undo" option. For example, an accepted word entered in the editor may be displayed as colored (e.g., via a green coloring) in the alternative suggestions list 104, to visually distinguish it from other alternative suggestions. Although not shown, the alternative suggestions list 104 may be displayed in a separate display, either in addition to, or instead of, the keyboard 100A. For example, the alternative suggestions list 104 may be displayed in a separate window positioned in proximity to the displayed (e.g., entered) text.

FIG. 1B illustrates an example QWERTY graphical or printed keyboard 100B that includes keys for Space 110, Backspace 112, Shift 114 and Enter 116 input. For example, numeric keys may typically be provided on typical conventional keyboards, but may be provided on another layer of the keyboard, which involves switching keyboard layers to access the numeric keys.

FIG. 2 illustrates example gestures on an example tap-plus-gesture graphical or printed keyboard 100, with arrows representing some examples of short user gestures. One skilled in the art of computing devices will appreciate that more elaborate gestures may be detected and used, however gestures in the form of simple strokes are shown for simplicity of explanation. For example, short strokes may be intuitive and easy for users to remember once learned. In some implementations, the length of the stroke or gesture may also be taken into account. For example, a very short stroke may be treated as a tap. As another example, the force profile of a tap may be used for such an inference. For example, a touch with a sharp force onset profile may be inferred as an intention of a tap, while a softer onset profile may be inferred as indicating intentional swiping motions (e.g., using a high sampling rate, around 1 kHz, to sense this pressure onset curve reliably.)

For example, a short linear stroke to the left 202 may be treated as Backspace, and a longer linear stroke to the left may be treated as a Delete Previous Word or Select Previous Word command. For example, a short linear stroke to the right 204 may be treated as Space. In some implementations, the speed, acceleration, and/or dynamic nature of the stroke or gesture may also be considered.

In FIG. 2, any key that is tapped (e.g., contacted and lifted off) may behave similarly to keys on other touch keyboards. Thus, tapping may provide an inference of the character or function (e.g., indicated by the symbol represented on the displayed key) of the key tapped. Thus, on the example keyboard 100, if the "a" key is tapped, a lower-case "a" is inferred as a user's intended keyboard input.

In accordance with some example techniques discussed herein, a gesture may be used to initiate an action, for example, with a holding action after initiation being used to enter a control state. For example, a stroke left 202 when lifted may be recognized as a backspace, whereas the same stroke, but followed by holding the end position of the stroke instead of lifting, may initiate an auto-repeat backspace. For example, moving left after this point may be used to speed up auto-repeat. For example, moving right may be used to slow down the auto-repeat, and potentially reverse the auto-repeat to replace deleted characters. For example, the auto-repeat backspace may be limited only to certain keys (e.g., may be limited only to numeric keys, as words typically do not contain numbers in their bodies), to avoid substantial ambiguity with other shape-writing gestures. For example, many users may frequently use the backspace functionality, and such a limit may substantially aid in disambiguation.

In accordance with example techniques discussed herein, if a user touches almost anywhere on the keyboard and executes a stroke to the right, a Space character may be inferred, as is illustrated by gesture 204. In accordance with example techniques discussed herein, a left stroke may represent a Backspace. Thus, for example, if the user touches (almost) anywhere on the keyboard and executes a stroke to the left, he/she may indicate a Backspace, which may result in deletion of one or more previous characters entered. This is illustrated by gesture 202. For example, certain keys may not respond to these gestures (e.g., keys at the edges of the screen, such as the Ctrl key, may have their own custom menus). For example, these gestures may be used substantially anywhere that the user would naturally touch during typing of normal words, but certain zones (e.g., near the edges, or on particular control objects) may be reserved for other purposes.

Figure 3:
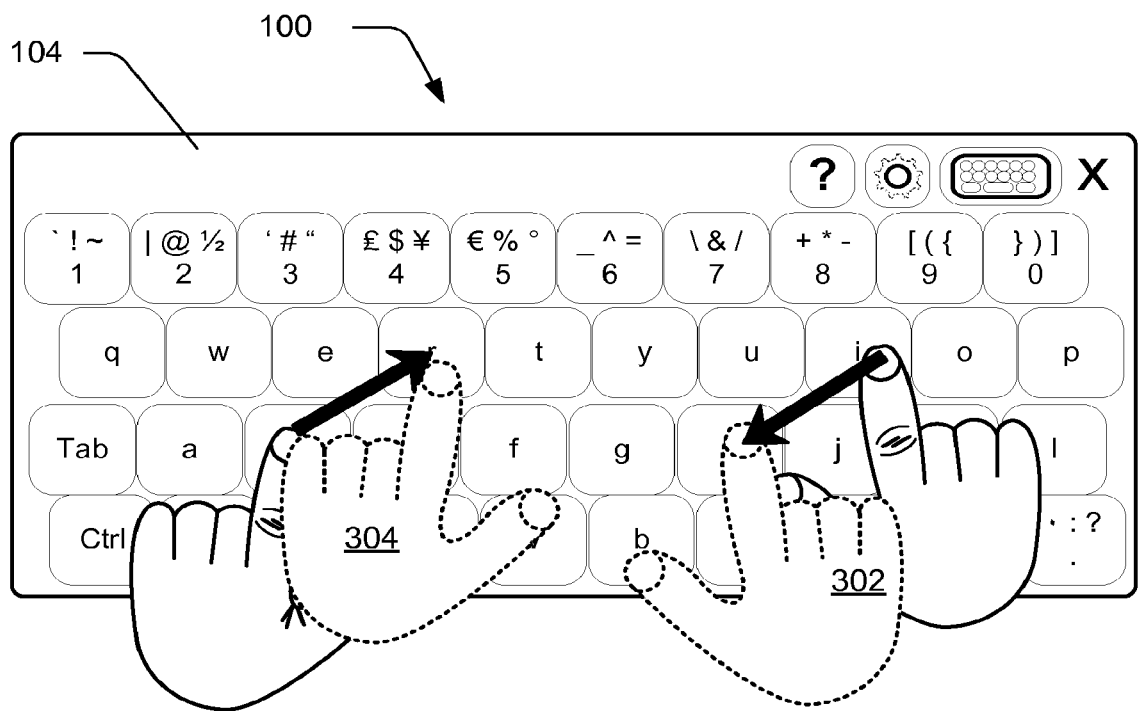
FIG. 3 illustrates an example of diagonal radial entry gestures.

In accordance with example techniques discussed herein, and as shown in FIG. 3, a downward-left stroke 302 may provide an Enter (or Return) entry. Thus, if the user touches anywhere on the keyboard and executes a downward stroke to the left, an "Enter" key may be inferred. For example, predetermined threshold angles may be used to differentiate user intent, for example, to differentiate whether a leftward and only slightly downward stroke is more likely a Backspace or an Enter stroke. In one implementation, for some or all of the gestures, the user can release outside of the displayed keyboard as long as the gesture was initiated inside the keyboard. As shown in FIG. 3, an upward-right stroke 304 may provide an Escape entry. Thus, if the user touches anywhere on the keyboard and executes an upward stroke to the right, an "Escape" key may be inferred.

One skilled in the art of computing devices will understand that, since the SPACE, BACKSPACE and ENTER strokes can be initiated anywhere on the keyboard, which is a large target, and since their direction is both easy to articulate and has strong mnemonic value, they may be articulated using an open-loop ballistic action (e.g., ballistic gestures not requiring any fine motor control), rather than a closed-loop attentive key press. The result may advantageously provide an easy-to-learn way to significantly increase text entry rates.

In FIG. 4, a linear upward stroke gesture 402 illustrates how an upward stroke gesture may be processed into a shift version of the character. Thus, instead of the user tapping, if the user executes an upward stroke, the shifted version of that character results. In the example of FIG. 4, if the "p" key is contacted followed by an upward stroke 402 (instead of a direct lifting of the finger or stylus) as indicated by gesture 402, an uppercase "P" results (as shown in the alternatives list area 102). For example, the finger doing the shift may be released outside of the key's area, as long as the gesture was initiated inside the key's area (e.g., the finger may be released above the key's area). While FIG. 4 shows an uppercase "P" in the alternatives list area 102, it is also possible that entries (e.g., an uppercase letter) may not appear in the alternatives list area 102.

As another example, a generic upward gesture, from a predetermined starting area on the keyboard, may be used to engage a shift state for the entire keyboard (rather than requiring a targeted gesture to produce the shift character, for a particular character). For example, this may help with edge gesture detection if a user needs to gesture from the bottom row of keys (which may inadvertently invoke other functionality). As another example, an upward gesture with two fingers instead of one (and initiated anywhere on the keyboard) may be inferred as a Caps Lock instead of Shift. Further, a downward gesture with two fingers down may restore the default state. As another example, in lieu of a two-finger gesture, a single finger gesture made while another finger is in contact with the keyboard may be interpreted to have a different meaning from a similar single-finger gesture.

As another example, radial menus and/or radial strokes may provide more alternatives for various keys on the Keyboard 100. For example, a user may tap and hold the "E" key and obtain a selection of several characters available via short directional strokes or gestures. For example, as shown in FIGS. 5A-5B, radial menus 502 and/or 504 may provide options via direction short strokes for the "E" key. For example, the radial menu 502 or 504 may provide a menu of various gestures that can be recognized from a touch input (or pen input, or input via other input objects) and a keyboard function that corresponds to each of the gestures. Thus, the user may be made aware of the keyboard functions available for input, which may enable a gesture to correspond to a different keyboard function in different applications and/or when performed on different keys while reducing potential user confusion. As shown in FIGS. 5A-5B, the radial menu 502 or 504 may enable, for example, a menu to be presented to a user based on a particular key, although the radial menu 502 or 504 that is presented may be presented independent of the location of the input. For example, the radial menu 502 or 504 may be displayed as overlaid on the keyboard, and/or on a different display device, and/or on the same display, but beside the keyboard, etc. For example, the radial menu 502 or 504 may be displayed in proximity to the associated key on the keyboard (e.g., surrounding the key). For example, the radial menu may be understood by the user, and may not be displayed during keyboard input, if desired.

When using radial menus, a keyboard engine may be configured to include a timing before showing the visual aid. For example, the keyboard engine may not initiate display of the radial menu until a predetermined threshold of time has passed.

Additionally, the keyboard engine may be configured to wait until a user "releases" before committing a result of an example command (as the user may still select a different operation). For example, if a user touches the letter 'e' and strokes up, but does not release—and decides to select something different, the user can modify his/her trajectory and move toward another direction before releasing (and committing).

Figure 6A:
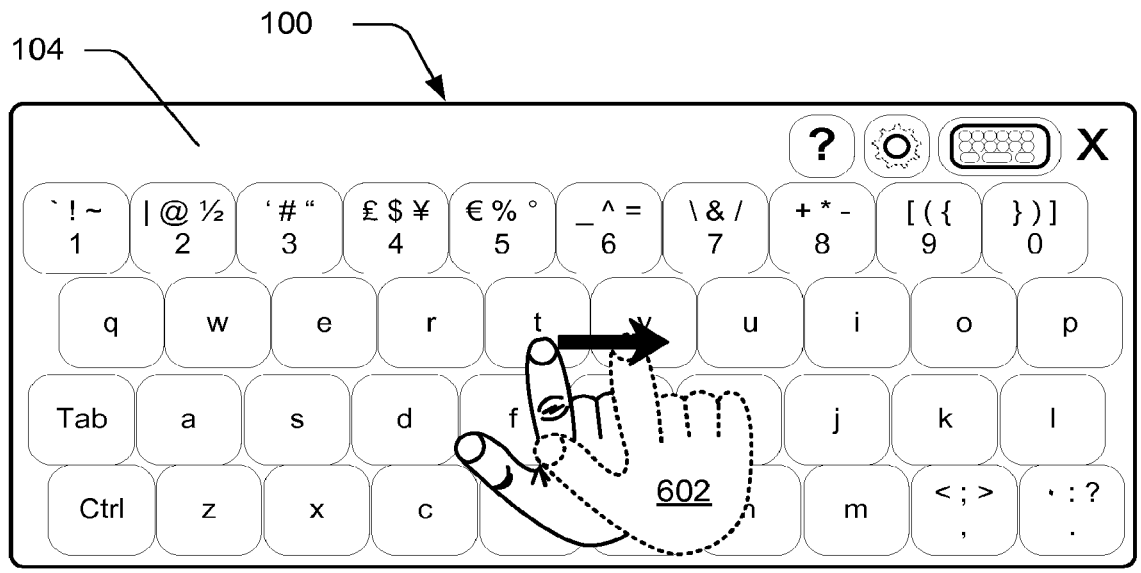
FIGS. 6A-6B illustrate example word predictions.
Figure 6B:
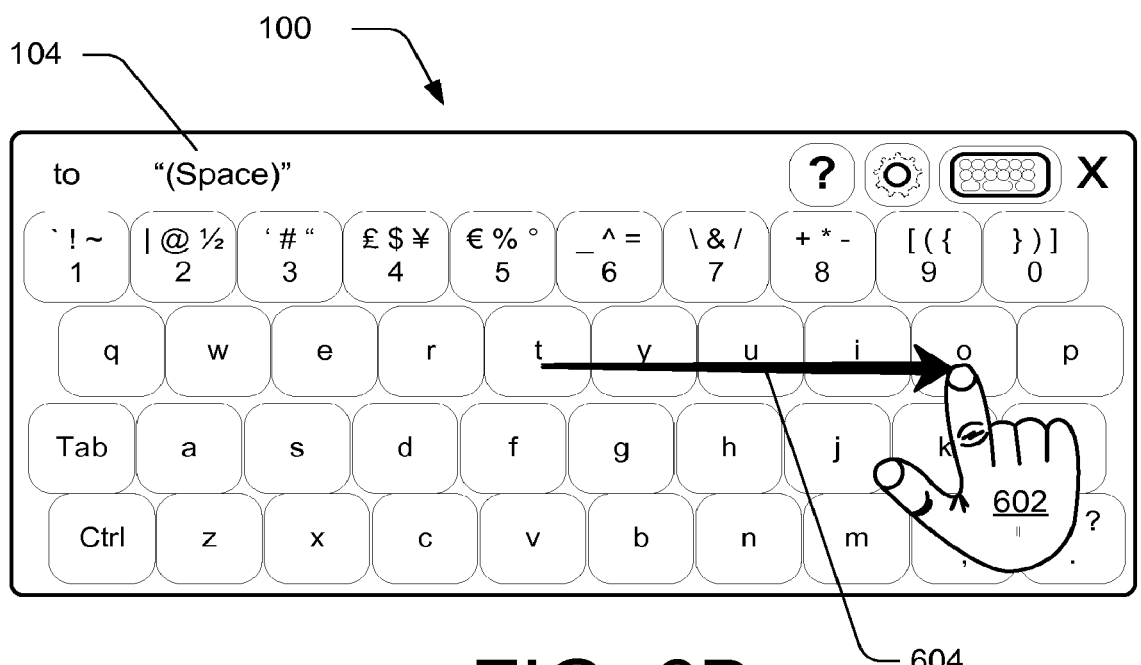

In accordance with example techniques discussed herein, word predictions may be integrated into an example keyboard engine, either together or independently with stroke shortcuts and shape writing. For example, Stroke Shortcut gestures may be provided as prediction alternatives in the case of potentially ambiguous shape-writing gestures. For example, as shown in FIGS. 6A-6B, the word "to" may be entered as a horizontal stroke 602 to the right, which is potentially confusable with an example stroke shortcut for Space, depending on the length of the gesture drawn by the user. For example, a word prediction engine may use a dictionary to determine one or more word predictions in accordance with a highest probability of the intended word. For example, the word predication engine may also use an n-gram language model to help interpret a shape-writing gesture. Further spelling correction may be used, either as a predicted corrected spelling separately, or in combination with the highest-probability word predictions. Further, the word prediction may be personalized to a user, to predict the highest-probability word predictions for a particular history, using a user profile history of past words used and/or selected. For example, the dictionary may be used to interpret meanings for input shape-writing. Thus, discrete text entry may be used as backup to enter words that are not in the dictionary used by the keyboard engine.

In this example, a shape-writing recognizer may presume "to" as the intended word, but a disambiguation engine may also offer "(Space)" as a prediction alternative in the alternative suggestions list 104 (along with any other word-prediction alternatives) to make it easy and convenient for the user to assert the gesture as the desired prediction, thus disambiguating the gesture. For example, the user may select the "to" option from the list 104. As shown in FIG. 6B, a trail arrow 604 may indicate a "comet trail" that temporally illustrates the path and timing of the gesture 602. For example, such a "comet trail" may aid the user in visualizing the path of the gesture on the keyboard 100, as received by the keyboard engine as input.

As another example, if a user stroked from the "w" key to the "e" key on a QWERTY keyboard, the stroke may ambiguously be interpreted both as a stroke shortcut gesture for a "space" key, or as a shape-writing stroke for the word "we." In accordance with example techniques discussed herein, a disambiguation engine may provide prediction alternatives that include both "we" and "(Space)" so that a user may resolve the ambiguity.

In accordance with example techniques discussed herein, the alternative suggestions list 104 may aid in resolving the ambiguities of the gesture. For example, although a typical word-alternate list may provide alternate words, example techniques discussed herein may also explicitly provide gestures as alternatives.

Figure 7A:
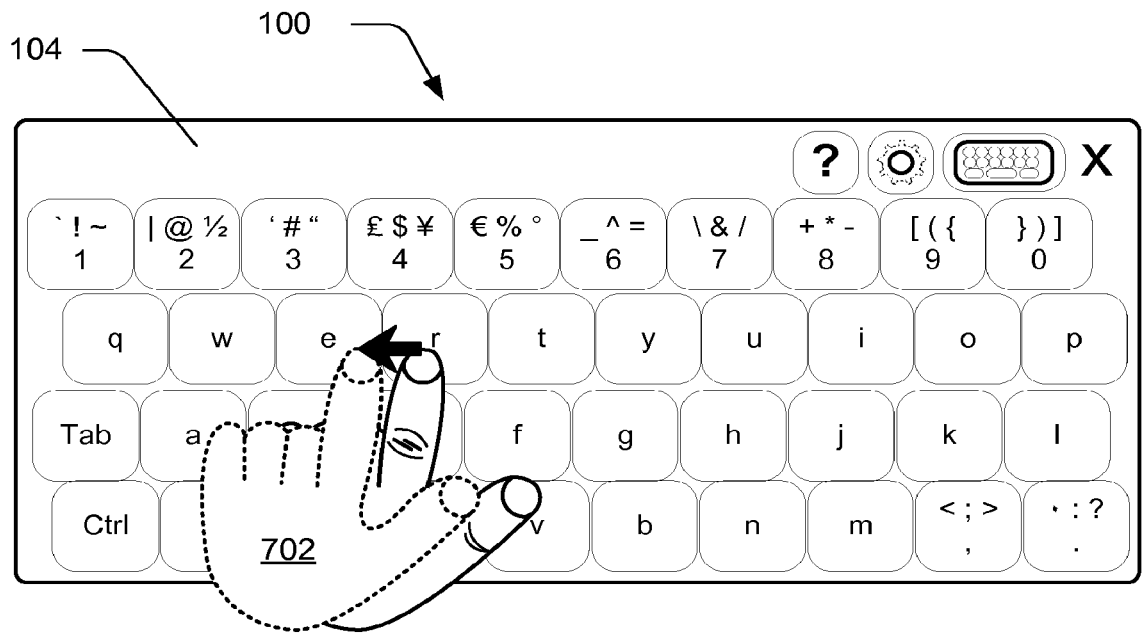
FIGS. 7A-7C illustrate example shape writing.
Figure 7B:
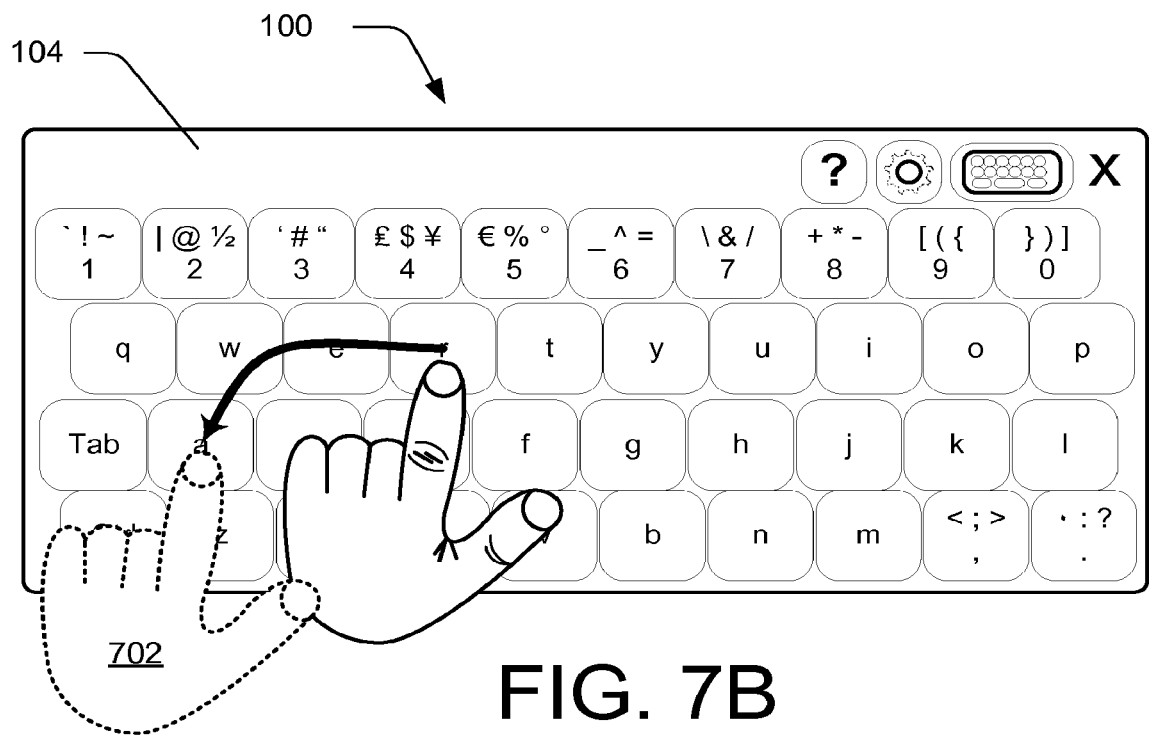
Figure 7C:
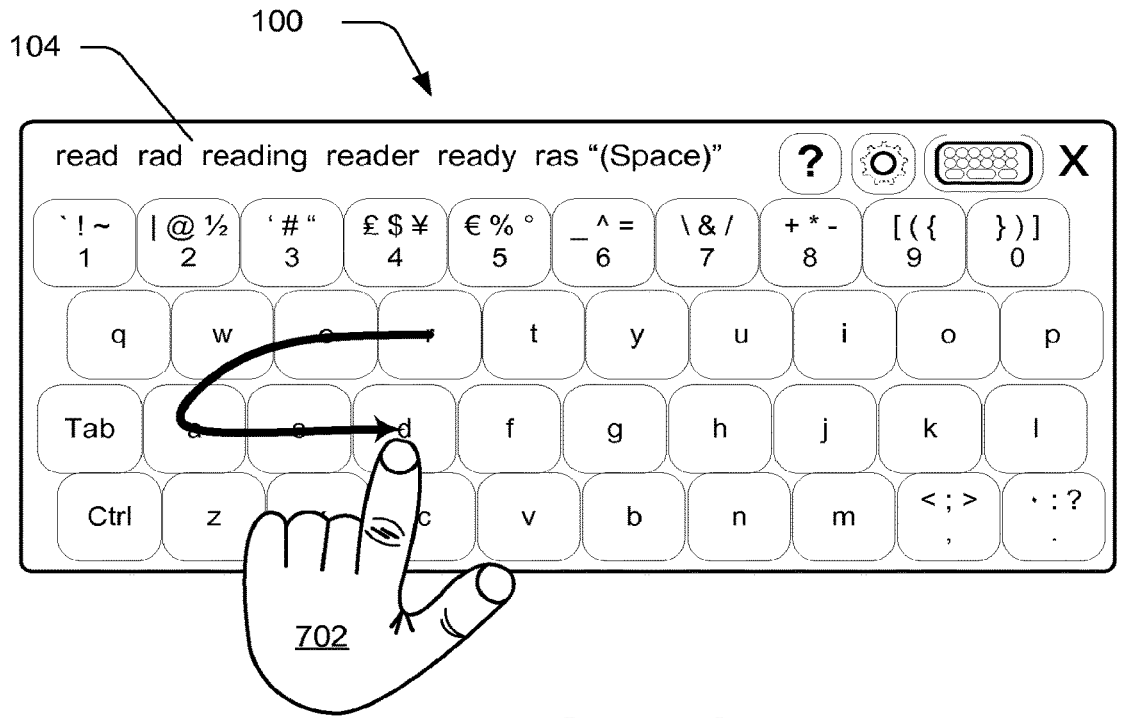

As shown in FIGS. 7A-7C, shape-writing may be used with the example keyboard 100 to enter whole words in a single gesture. As shown in the example of FIG. 7A, the user may initiate a gesture 702 by touching the "r" key and horizontally stroking left toward the "e" key. If the touch ended at this point, the alternative suggestions list 104 could display "re" and "(BACKSPACE)" at this point, as short horizontal gestures or strokes horizontally to the left may (ambiguously) be interpreted as a user intent to enter "Back-Space" (e.g., as illustrated by the short linear stroke to the left 202 discussed above). As shown in FIG. 7B, the gesture 702 continues moving, reaches the "e" key and angles down, to the left, toward the "a" key, via a gestured inflection point at the "w" key. If the touch ended at this point, the alternative suggestions list 104 might display "rea" and "(Enter)" at this point, as short, angled gestures or strokes diagonally down and to the left may (ambiguously) be interpreted as a user intent to enter "Enter" (e.g., such as the downward-left stroke 302 discussed above). The alternative suggestions list 104 might also display other potential alternatives for the current gesture, including "rew", "ra", "re", and "(BACK-SPACE)" (from the previous inference), if the touch ended at this point. For example, if the touch ended at this point, a disambiguation engine could infer that "BackSpace" was not intended previously, as the gesture has now angled in a different direction.

As shown in FIG. 7C, the gesture 702 continues moving, reaches the "a" key and angles right, horizontally, toward the "d" key, via a gestured inflection point at the "a" key. As shown in FIG. 7C, the alternative suggestions list 104 may display "read" and "(Space)" at this point, as short, angled gestures or strokes horizontally to the right may (ambiguously) be interpreted as a user intent to enter "Space" (e.g., as illustrated by the short linear stroke to the right 204 discussed above). The alternative suggestions list 104 may also display other potential alternatives for the current gesture, including "rad", "reading", "reader", "ready", and "ras", as shown. For example, a disambiguation engine may now infer that "Enter" was not intended previously, as the gesture has now angled in a different direction.

For example, the disambiguation engine may also infer a user's intent via a dictionary lookup in a dictionary associated with shape-writing. For example, a word prediction engine, using such a dictionary, may provide options such as "read", "rad", "reading", "reader", and "ready", as likely intended words for a shape-writing gesture temporally traversing the keys for the letters "r" followed by "e" followed by "a" followed by "d".

For example, visual indicators may be provided as feedback for a user of the keyboard that may indicate various aspects of strokes as they are input. For example, a "comet trail" may be displayed during execution of a stroke (e.g., displayed as overlaid on the keyboard), to visually, graphically indicate a starting point and temporal path of the stroke on the keyboard, as it is executed. For example, such feedback may continue to be displayed after execution of a stroke, to provide a user with an opportunity to provide additional input (e.g., selecting displayed alternatives or discarding one or more currently displayed alternatives, or "undoing" a gesture/stroke input). For example, the comet trail may appear thicker (and brighter) at display points on the keyboard that were more recently touched (or "hit") during execution of the stroke, and may appear thinner (and less bright) at display points on the keyboard that were less recently touched (e.g., providing a graphical temporal history of the stroke as it progresses to completion). For example, an arrow-type of stroke trail may be used, to provide the graphical temporal history of the stroke (e.g., indicating direction of the stroke temporally during execution). For example, color may also be used to indicate that the gesture was clearly interpreted (e.g., the comet tail turns green, to indicate "understood," or red, to indicate "not understood," once the gesture completes). Thus, the user may be provided with graphical output to verify their intent in stroke/gesture entry, as part of an example disambiguation technique.

Additionally, although not explicitly shown in the drawings, colors and shades may be used (e.g., a medium gray for the SHIFT characters, and closer to a true white for the numbers themselves), to provide visual ease of understanding current states of keyboard input. Other visual indicators may be used as well, for example, the keys may be displayed as connected when the keyboard is in shape-writing mode. One skilled in the art of computing devices will understand that any type of graphical technique may be used to provide such visual ease of understanding current states of keyboard input. For example, haptics may be used so that the user may feel which mode he/she is in, and/or may be used to guide a user's finger(s) (e.g., using a haptics texture, and/or different haptic feedback when the finger or input object is crossing the key's boundaries in shape-writing entries, as opposed to radial menu entries). Further, audio cues may be used, with or without haptics.

In accordance with example techniques discussed herein, the word (or other symbolic) predictions discussed above may provide a list of prediction alternatives that may include both potential shape-writing candidates and short-stroke (or radial entry) alternatives that may explicitly indicate radial entry strokes and/or stroke shortcuts as predictions. For example, the list may include explicit text names and/or graphical objects that represent the short-stroke (or radial entry) alternatives (e.g., the text "(Space)" listed as an alternative). For example, such a list of alternatives may provide a user with an opportunity to provide disambiguation input in the form of a selection from the list of prediction alternatives. In accordance with example techniques discussed herein, the predictions may be displayed on the keyboard (e.g., at the top of the keyboard), or in association with the keyboard, as the gestures are being entered. In accordance with example techniques discussed herein, the predictions may be displayed on the keyboard, along with a selectable "undo" selection (e.g., as a graphic selectable "undo" symbol, and/or as a selectable text option).

In accordance with example techniques discussed herein, a user may indicate a selection of an alternative in the alternative suggestions list 104 via radial entry strokes. For example, the user may provide a stroke straight down (on a key or not) to select from the Word/Gesture Predictions at the top of the keyboard (if any). If there are no predictions this may be inferred as a no-op. For example, stroking straight down selects the default (first) choice in the list. For example, stroking straight down with a 45-degree inflection to the right may be inferred as a selection of the second choice. For example, stroking straight down with a 90-degree inflection to the right may be inferred as a selection of the third choice. Alternatively, the user may also tap on a displayed alternative suggestion to select it.

In accordance with example techniques discussed herein, another example implementation for prediction selection with shape-writing may involve displaying a radial menu with selections as soon as they are available and a user slows down with the finger or other input object (e.g., meaning the gesture is most likely completed). For example, the radial menu may appear directly at the finger location when the finger slows down. For example, if the user then accelerates again (e.g., because he/she has not actually completed his/her activity with the entire word), the intermediary suggestions in the radial menu may fade out and the user may be provided with a display of another radial menu with suggestions when the finger slows down again. For example, the down selection may be the default prediction. In this example scenario, a short stroke down may be used to select the default prediction.

In accordance with example techniques discussed herein, certain low-frequency words may be omitted or removed from the word dictionary in consideration of potential confusion with commonly entered stroke shortcuts. For example, the word "igg" appears in English dictionaries (a slang word, to ignore or to snub), but currently is rarely used and thus may be omitted from an example shape-writing dictionary so as to ignore possible conflict with an example "Enter" gesture (e.g., stroking down and to the left), which, if articulated starting in the vicinity of the 'i' key, may trigger shape-recognition of this word. For example, the word dictionary may exclude low-frequency terms that may cause a conflict between straight-line radial menu strokes and (infrequent) shape-writing words. For example, it may generally be desirable to have a fairly complete dictionary, even for low-frequency words, but when those words are determined as substantially more likely (e.g., around 90% probability, or higher) to be misrecognized stroke gestures, it may be more desirable to omit them.

In accordance with example techniques discussed herein, both touch and pen input may be used on a keyboard. For example, a choice of touch or pen modality may be used to separate shape writing functionality from stroke gesture functionality. In accordance with an example technique, stroke gestures may only be articulated by touch and shape-writing gestures may only be articulated with the pen. Alternatively, pen and touch input may be treated equally. Further, mouse input may be used to distinguish shape writing input from stroke gesture input. One skilled in the art of computing devices will appreciate that other forms of input (with other input objects) may also be used.

In accordance with an example technique, a touch-only mode may be invoked to explicitly allow shape writing with a finger.

Figure 8:
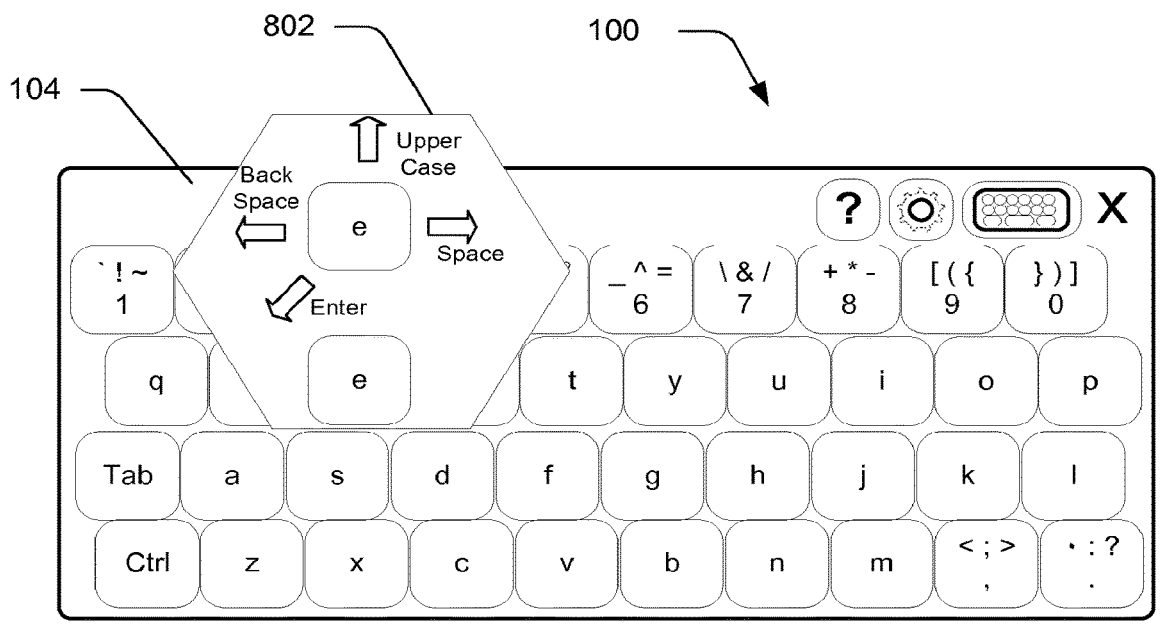
FIG. 8 depicts an example radial gesture help menu associated with radial gesture functionality

FIG. 8 depicts an example radial gesture help menu 802 associated with radial gesture functionality. For example, a user may access the radial gesture menu 802 by entering a control input designated to initiate the display of the radial gesture menu 802. For example, the radial gesture menu 802 may be displayed as a "slide-up" menu from a keyboard location (e.g., a key location), after the user has executed a "touch and hold" entry for at least a predetermined time threshold value associated with the radial gesture menu 802. As shown in FIG. 8, if the user has executed such a "touch and hold" entry on the "e" key, then the radial gesture menu 802 may be provided as a "slide-up" display menu that is visible to the user in an area over the depressed key (e.g., the "e" key as shown in FIG. 8), so that the user may be able to view the radial menu options without any of the options being occluded by the user's finger (or other object used for keyboard input). Further, for example, the radial gesture menu 802 may be displayed and translucent, to provide at least some visibility of keys that are underneath its display. As shown in FIG. 8, the radial menu may provide help that a left stroke may represent a Backspace, a right stroke may represent a Space, an upward stroke may represent Uppercase, and a left-downward stroke may represent Enter. Thus, for example, if the user touches anywhere on the keyboard and executes one of these strokes, he/she may indicate a respective keyboard input, as indicated in the radial gesture help menu 802.

Figure 9:
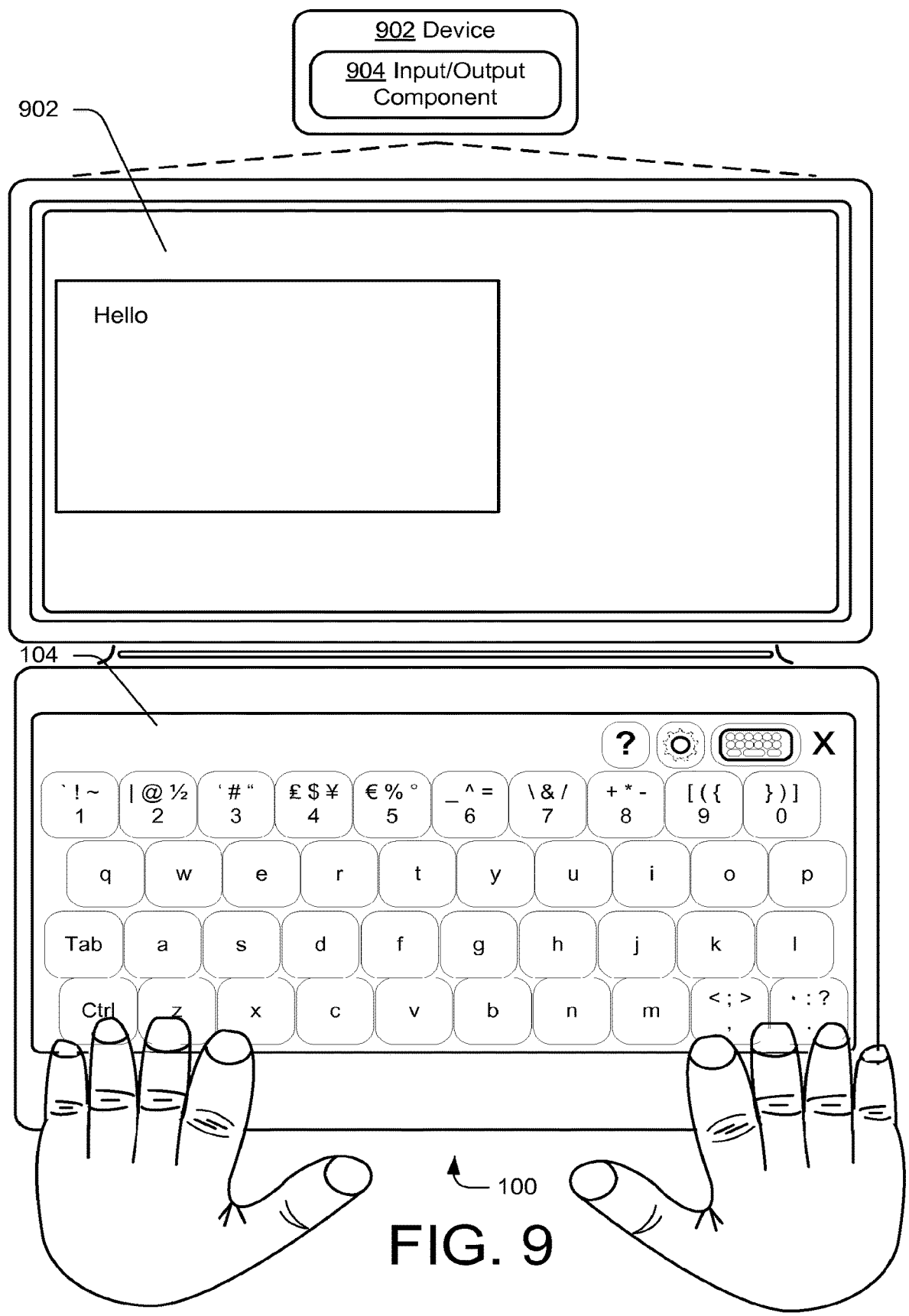
FIG. 9 depicts an example device with an example keyboard attached

FIG. 9 depicts an example device 902 with the keyboard 100 attached, showing the word "hello" on a display 902 (which may be a touch display or a non-touch display), after the user has selected the "hello" alternative from the alternative suggestions list 104. As shown in FIG. 9, an input/output component 904 may be included in the device, for example, to obtain input from, and provide output to, the keyboard 100A. Although not shown, the alternative suggestions list 104 may be displayed in the display 902, either in addition to, or instead of, on the keyboard 100A.

In accordance with example techniques discussed herein, a state machine may be used as part of the disambiguation of the various input gestures. For example, a disambiguation engine may obtain keyboard input data indicating entry of stroke data or gesture data. For example, predetermined threshold values may be used to determine whether the stroke data corresponds to a radial entry (e.g., a stroke shortcut) or a shape-writing stroke. For example, an input data interpretation module may determine a length of a stroke, as well as a starting point and direction of the stroke. For example, if a user has been in (currently) "tap" mode, and then touches down on a key, followed by a directional movement to another key that is separated, by several keys, from the initially touched key, then an entry mode transition to shape-writing mode may be seamlessly provided.

Other criteria are possible, for example, including pressure profile of a stroke, three-axis accelerometer and gyroscope motion sensor signatures for inferring the type, location, and nature of the touch based on the resultant motion profile, and/or full instantaneous three-dimensional (3D) orientation derived from sensor fusion of accelerometer, gyroscope, and magnetometer sensor readings. One skilled in the art of computing devices will appreciate that there are many ways to refine touch input based on such sensor signals, or to adjust or improve touch handling by inferring the type of touch (e.g., thumb vs. forefinger inputs) from the motion and touch signals combined. For example, these channels may be used to determine the type of input, for example, as additional features that may be used in a machine-learning approach to disambiguate inputs.

For example, an input data interpretation module may determine whether the stroke included one or more inflections points, and respective angles associated with changes in direction of the stroke, at each respective determined inflection point. For example, a stroke with inflection points may raise a presumption that the stroke is intended as a shape-writing stroke. In this context, "inflection point" may refer to a point at which a stroke includes a substantial change in direction during entry of the stroke. For example, an inflection point may include a point on a curve that separates an arc concave upward from an arc concave downward and vice versa. However, in shape-writing, some words may involve only a one-directional movement (e.g., 'we', 'to', 'all', 'rip'), with no inflection points. It is the set of screen points in the traveled path that is primarily considered input for shape-writing detection. For example, the state machine may be used to track current (and past) keyboard entry modes as states in a state diagram. For example, if a current state indicates "shape-writing" mode, then there may be a high probability that a next keyboard input will continue in "shape-writing" mode. Thus, a history of input modes may be used to infer a user's intent in their succeeding (i.e., next in time) inputs.

For example, modes may be changed by the next input, or may be changed by explicit inputs such as applying substantially more pressure on a key, which may be interpreted by the keyboard engine as an intent by the user to change keyboard entry mode. As another example, a substantially light touch may be interpreted as an intent to use shape-writing mode, and a substantially strong pressured touch may be interpreted as an intent to use gesture modes other than shape-writing mode. For example, determinations of pressure (e.g., on a pressure-sensitive keyboard) may be used for input disambiguation.

For example, by comparing the observed length with a predetermined threshold length, it may be determined that a stroke executed with a greater length is more likely intended as a shape-writing stroke.

For example, the input data interpretation module may determine a velocity and/or acceleration of execution (e.g., speed and/or acceleration of entry) of the stroke. For example, by comparing the observed velocity and/or acceleration with a predetermined threshold velocity and/or acceleration, it may be determined that a stroke executed with a greater velocity and/or acceleration (e.g., faster, speedier) may indicate a stroke shortcut, or a shape-writing gesture that the user may frequently use.

For example, a keyboard engine input module may receive input corresponding to a touch on the keyboard. Various properties of the touch may be determined, such as location on the keyboard, surface area on the keyboard that is encompassed by the touch, etc. For example, a keyboard engine may interpret an initial touch as a start input of a gesture. For example, if the initial touch is the terminal action of the gesture, then the touch may be interpreted as an intent of the user to "tap" on that location of the keyboard, and the input may be interpreted as an intended entry of the key that is substantially located at the location touched, for example, in "tap" mode.

For example, an intent disambiguation engine (e.g., with the aid of a state machine that tracks states corresponding to keyboard entry modes as the user enters keyboard input) may track states such as "tap" or "type" mode, "shape-writing" mode, and/or "radial-entry" input entry. For example, if a last state before a current entry was "tap" mode or "type" mode, then there may be a high probability that the next keyboard input will be intended as being in "tap" mode or "type" mode, unless a temporal directional gesture is received, at which point the mode may change to a different mode of input (e.g., "shape-writing" mode), which may then be considered as an input to the state machine to make a determination to move to a different state (e.g., a "shape-writing" state). For example, if the last (current) state was a state of being in "shape-writing" mode, then there may be a high probability that the next keyboard input will be intended as being in "shape-writing" mode. For example, the current input mode may be indicated to the user of the keyboard as he/she continues keyboard entry (e.g., as a keyboard mode indicator on the keyboard or device display or as visual indicators such as change of color of the keyboard, different appearance of one or more keys on the keyboard, etc.).

For example, if the initial touch is followed by gestured movement on the keyboard to a location on the keyboard that is different from the initial touch location, then the keyboard engine may interpret such movement as an intent by the user to input a gesture. For example, if the movement exceeds a predetermined threshold movement length (e.g., 20 pixels), then the keyboard engine may interpret such movement as an intent by the user to input a shape-writing gesture. For example, the predetermined threshold movement length may be determined as a value that depends on the size of the keyboard, size and resolution of the display, and/or a value that depends on whether the display is vertical, incline, or horizontal, etc. For example, input data received by an input module of the keyboard may store the input data as the movement proceeds, so that the keyboard engine may interpret the input to temporal states involved in the temporal movement associated with the input gesture.

For example, the keyboard engine may analyze an input gesture path from an initial input "finger down" and on through each stage of the "finger movement" to a final input of "finger up." The keyboard engine may use such a path to interpret the gesture and determine one or more potential intents of the user. For example, the keyboard engine may determine potential disambiguations of the input, to determine whether the user intent was to provide short-stroke or radial input, or to provide shape-writing input.

For example, the intent disambiguation engine may utilize various properties of the input to characterize various touches and movements. For example, the properties may include a length of the movement (e.g., "how far did the user input move?", "how many pixels or keys did the movement move through?"), a path of the movement (e.g., "what letters or keys did the user input move through?", "what direction or directions did the user movement move through?", "Where did the movement start and where did it end (what path did it take)?", "What was the length of the path?"), and an amount of time used to complete a particular input gesture (e.g., more time used may imply an intent to input a shape-writing gesture). Further, the intent disambiguation engine may utilize properties that include the dynamic of the stroke (e.g. accelerate, decelerate, accelerate, etc.).

Additionally, the properties may include an acceleration in input speed as the gesture is input, a user history of time spent looking at menus or a user history associated with entry of various types of input. For example, observed values may be compared against threshold values to aid in disambiguation. For example, a user profile may be used to provide information regarding a user's past intent in various types of keyboard input. Further, the properties may include a determination of a key that was touched to start a gesture input, as short-stroke gestures for certain functionality may be limited to certain keys (e.g., auto-repeat backspace may be limited only to numeric keys).

For example, if the length of the movement is determined as less than a predetermined length threshold value, then a particular movement may be interpreted as an intent by the user to provide a short gesture, which may be interpreted as radial input, or radial menu input. As another example, if a movement is initiated in a radial area of a key, and the movement passes outside the radial area, and continues for a length of time that is greater than a predetermined threshold time, then an intent may be inferred that the user intended to use shape-writing mode (and not radial-entry input or tap mode).

Figure 10A:
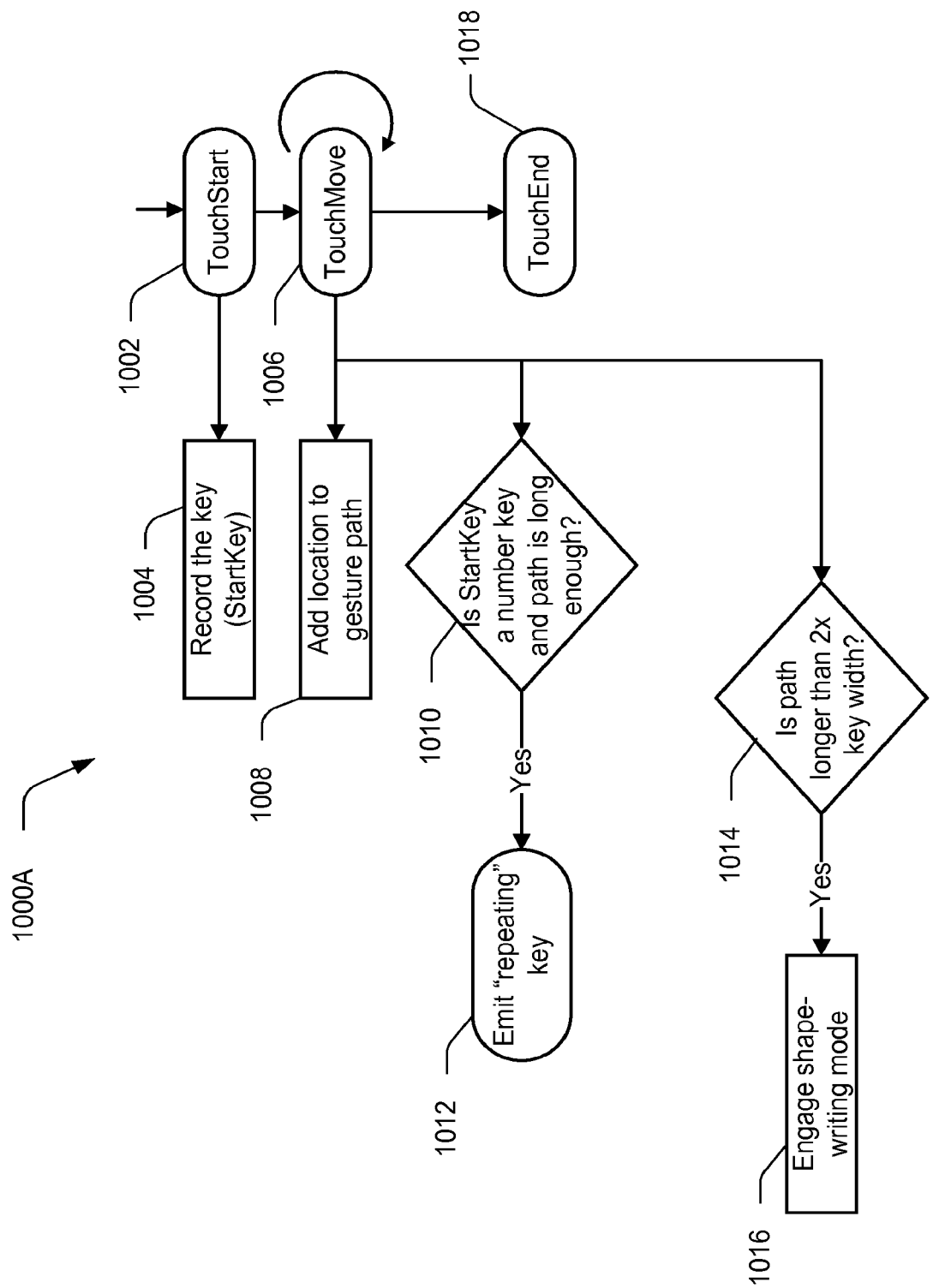
FIGS. 10A-10B depict an example state machine that may be used by an example intent disambiguation engine.
Figure 10B:
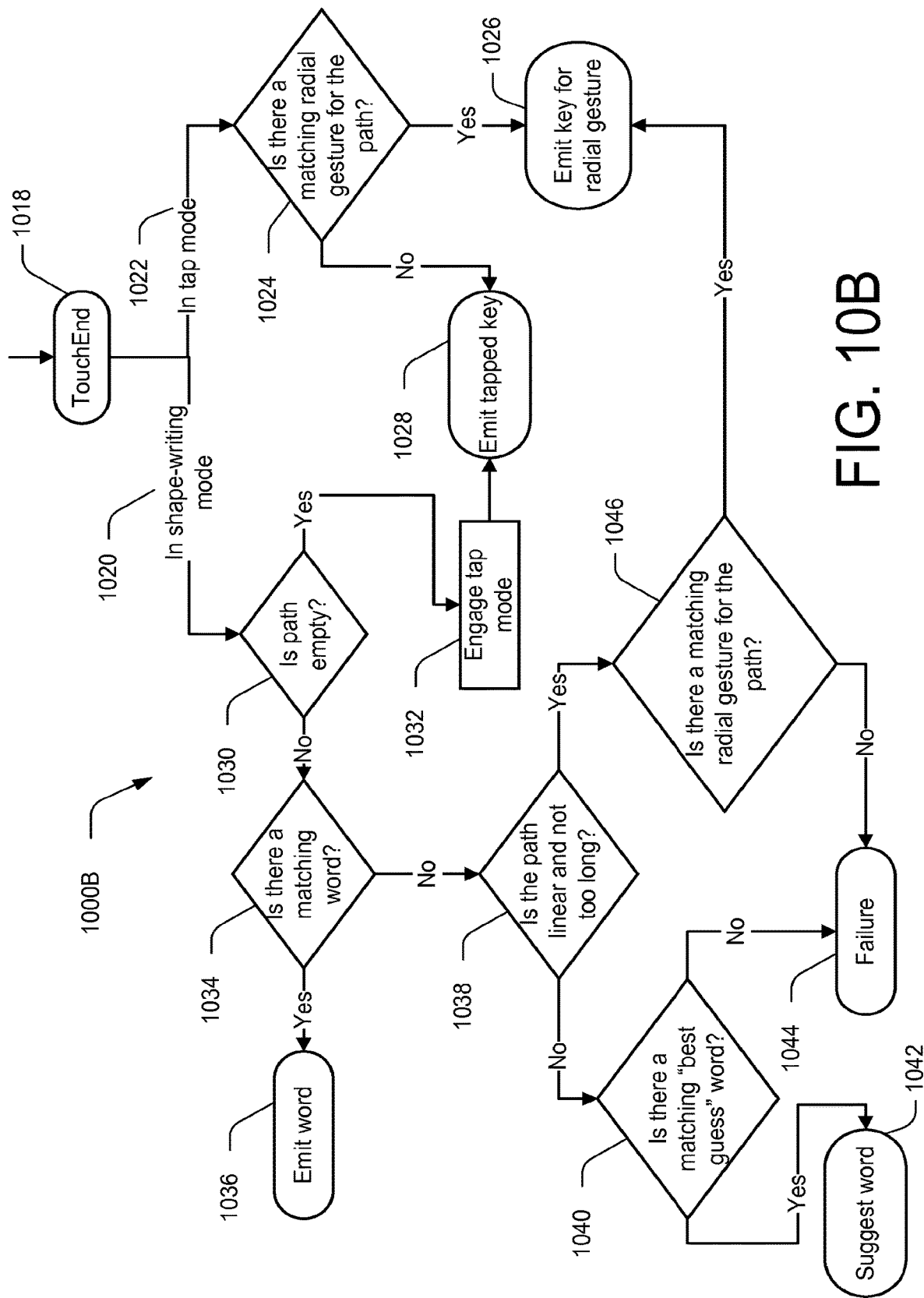

FIGS. 10A-10B depict an example state machine that may be used by an example intent disambiguation engine. As shown in FIG. 10A, a state diagram may be used to illustrate the states and transitions of the example state machine.

As shown in FIG. 10A, a user may begin an input to a keyboard at a state TouchStart 1002, at which point the key may be recorded at Record the key (StartKey) 1004. The user may move the finger or other input object, at TouchMove 1006, at which point the attained location may be added to the gesture path (at Add location to gesture path 1008).

At 1010, it is determined whether the start key is a number key, and whether the path is "long enough" (e.g., greater than a predefined threshold gesture path length). If so, a "repeating" key is emitted at 1012.

At 1014, it is determined whether the path is longer than double (2×) the key width. If so, shape-writing mode is engaged at 1016.

TouchMove 1006 iterates until TouchEnd 1018 is reached, when the current touch activity is terminated.

As shown in FIG. 10B (starting at TouchEnd 1018 from FIG. 10A), progress proceeds in either shape-writing mode 1020 (e.g., from engagement of shape-writing mode at 1016), or in tap mode 1022.

If in tap mode 1022, at 1024, a determination is made whether there is a matching radial gesture for the path. If so, a key for the radial gesture is emitted at 1026. If there is not a matching radial gesture for the path, the tapped key is emitted at 1028. In this context, "emit" may refer to outputting information from the keyboard engine (e.g., displaying the information on a display device, storing the information on a storage medium, printing the information, etc.).

If the system is in shape-writing mode 1020, a determination is made whether the path is empty, at 1030. If the path is empty at 1030, tap mode is engaged at 1032 and the tapped key is emitted at 1028.

If the path is not empty at 1030, a determination is made whether there is a matching word, at 1034. If so, the matched word is emitted, at 1036.

If there is not a matching word at 1034, a determination is made whether the path is linear and not too long (e.g., less than a predetermined threshold value), at 1038. If "no" at 1038, a determination is made whether there is a matching "best guess" word, at 1040. If there is a matching "best guess" word at 1040, the word is suggested, at 1042. If there is not a matching "best guess" word at 1040, failure is inferred, at 1044. In this context, "failure" refers to a failure to detect the user's intent from the supplied inputs.

If it is determined that the path is linear and not too long at 1038, a determination is made whether there is a matching radial gesture for the path, at 1046. If so, a key for a radial gesture is emitted, at 1026. If it is determined that there is not a matching radial gesture for the path, at 1046, failure is inferred, at 1044. In this context, "failure" refers to a failure to detect the user's intent from the supplied inputs.

In accordance with example techniques discussed herein, a radial menu may be requested via a "touch and hold" input on a particular key, to provide a graphical display surrounding the key, that indicates directional short strokes that may be entered to obtain various characters (or functions) different from the "base" character that is touched (e.g., upper case, different language, punctuation symbols, etc.—obtainable via a short stroke in the indicated direction). In accordance with example techniques discussed herein, the radial menu may be displayed initially as surrounding the selected key, but then may slide up (e.g., after a predetermined time threshold value) on the keyboard to avoid occlusion of the display by the user's finger (or other keyboard entry object). Whether the graphical display surrounds the key or slides up, an indication of which direction and character is currently selected may be displayed so that the user may understand what to expect as soon as the finger (or other input object) is released. In accordance with example techniques discussed herein, the user may enter stroking radial menu gestures without requesting the radial menu, and disambiguation techniques may be used (e.g., via a disambiguation engine) to disambiguate user gestures to differentiate between radial gesture entries and shape-writing gestures.

Figure 11:
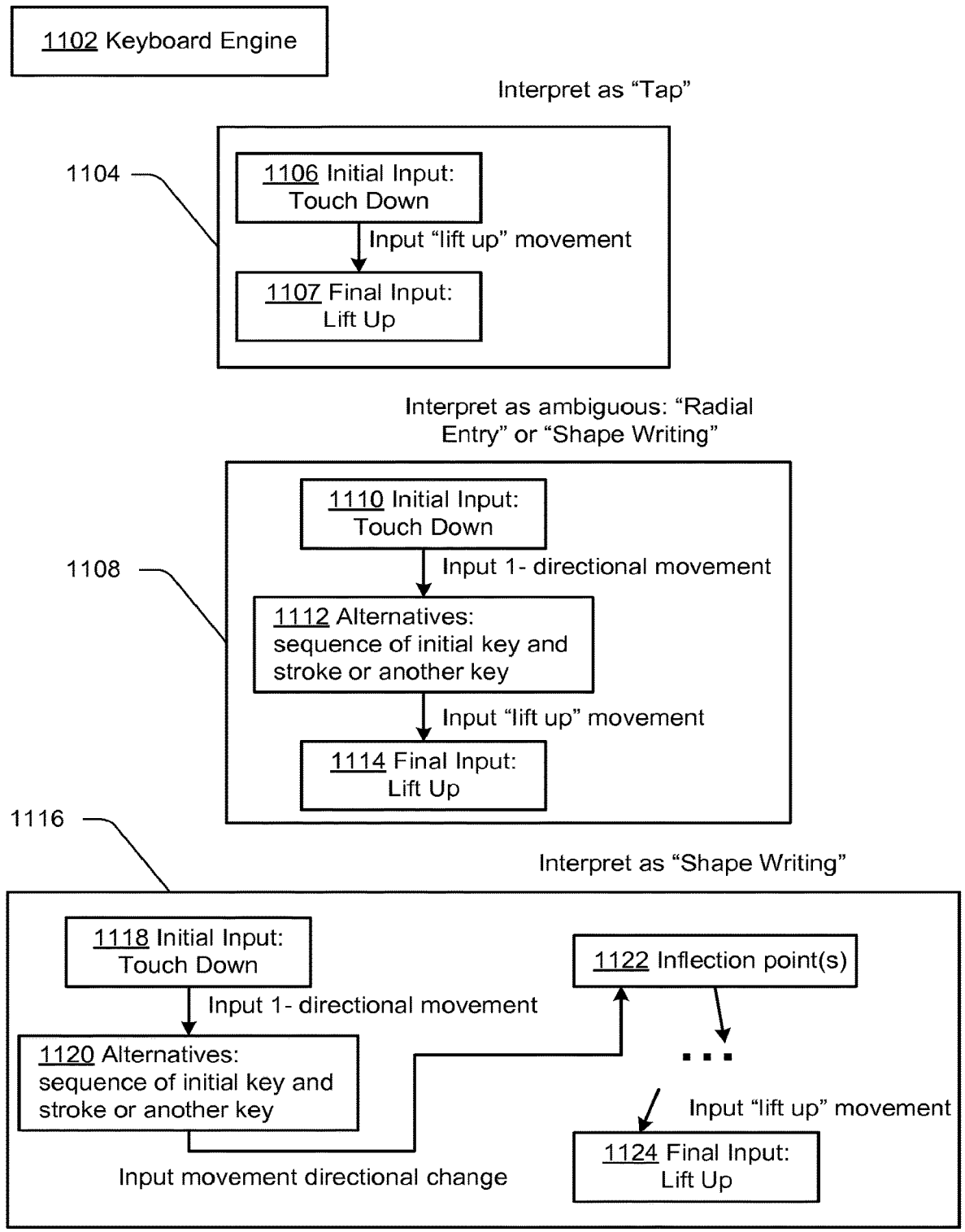
FIG. 11 illustrates example logic for an example keyboard engine.

FIG. 11 illustrates an example of simplistic generalized logic for a keyboard engine 1102, as segments 1104, 1108, and 1116 that may represent generalized segments of tracing of input to the keyboard 100 (for ease of readability herein), that may be used by the keyboard engine to interpret the input. For example, as shown in FIG. 11, an initial input 1106 of "Touch Down" may be determined as a result of receiving "touch down" input from the keyboard 100, followed by an input "lift up" movement. A final determination of "Lift Up" 1107 may then be inferred, at which point an interpretation may be inferred that the user intended to "tap" a particular key on the keyboard to provide that as input, corresponding to the logic segment 1104.

For example, an initial input 1110 of "Touch Down" may be determined as a result of receiving "touch down" input from the keyboard 100, followed by an input one-directional movement. An inference of "Alternatives" 1112 may then be entered, followed by an input "lift up" movement. For example, the "Alternatives" 1112 may include a sequence of an initial key followed by a stroke, or an initial key followed by another key. A final determination of "Lift Up" 1114 may then be inferred, at which point an interpretation may be inferred that the user intended to either provide a "Radial Entry" or a "Shape Writing" entry, as discussed above, and corresponding to the segment 1108. For example, example disambiguation techniques may then be utilized, as discussed further herein.

For example, an initial input 1118 of "Touch Down" may be determined as a result of receiving "touch down" input from the keyboard 100, followed by an input one-directional movement. An inference of "Alternatives" 1120 may then be entered, followed by an input "directional change" movement. For example, the "Alternatives" 1120 may include a sequence of an initial key followed by a stroke, or an initial key followed by another key. In shape-writing, some words may involve only a one-directional movement, with no inflection points. It is the set of screen points in the traveled path that is primarily considered input for shape-writing detection. Optionally, an inference of "Inflection Points" 1122 may be entered, followed by various other input. For example, the inflection points may be analyzed to determine angles of directional change in movement of the input gesture, as well as velocity and/or acceleration of movement and other attributes of the gesture movement. An input "lift up" movement may ultimately be received. A final determination of "Lift Up" 1124 may then be entered, at which point an interpretation may be inferred that the user intended to provide a "Shape Writing" entry, as discussed above, and corresponding to the logic segment 1116.

However, a stroke for the radial menu may not involve only a one-directional movement. For example, on a radial menu, a user may stroke up, and then decide to move toward the left before releasing to enter a backspace instead of a shift. Additionally, in shape-writing, some words may involve only a one-directional movement (e.g., 'we', 'to', 'all', 'rip'), with no inflection points. It is the set of screen points in the traveled path that is primarily considered input for shape-writing detection.

In accordance with example techniques discussed herein, shape-writing gestures may be distinguished from radial entry inputs via various attributes of the input. For example, a disambiguation engine may determine a different pressure used by a user to input shape-writing gestures, as distinguished from radial entry input (e.g., light touch/hover for shape writing, stronger touch/hover for radial entry input). For example, touch pressure sensing and/or sensing above the display may be used to detect such different pressures, for determining whether the input is intended as shape writing input or radial entry input.

For example, for keyboards that support pen sensing and touch sensing, a pen input may indicate that an input is intended as a shape-writing input, while a touch input may indicate that an input is intended as a stroke gesture.

For example, for keyboards that support multitouch sensing, the number of fingers used for an input may be used to distinguish the inputs. For example, a two-finger input may be interpreted as indicating that an input is intended as a shape-writing input, while a one-finger input may be interpreted as indicating that an input is intended as a stroke gesture.

For example, a disambiguation engine may also distinguish between shape-writing gestures and radial entry inputs based on a skill level of the user (e.g., an experienced user may not intend an 'enter' gesture by moving an input object or finger to the right and then down, whereas a beginner might provide such input with that intent).

For example, a disambiguation engine may distinguish between shape-writing gestures and radial entry inputs based on a preferred language of the user.

For example, a disambiguation engine may distinguish between shape-writing gestures and radial entry inputs based on a dynamic of the stroke (e.g., acceleration, speed, curve, etc.). For example, machine learning may be used to train the disambiguation engine in its disambiguation of these types of input features.

For example, for devices that may sense a user's grip on the device (e.g., via grip sensors), a disambiguation engine may distinguish between shape-writing gestures and radial entry inputs based on the user's grip on the device (e.g., grip on a slate case, etc.).

In accordance with example techniques discussed herein, a graphical indicator such as a "comet trail" may be displayed to provide a graphical indicator for the user of his/her temporal gesture path. Thus, in accordance with example techniques discussed herein, a flick to the right may indicate an intent to enter a Space, and a longer stroke to the right may indicate an intent to enter a Tab. Alternatively, flicks (e.g., instead of long strokes) may trigger Shape-writing mode (e.g., for any stroke direction).

In accordance with example techniques discussed herein, slow, closed-loop motions may be inferred as an intent to transition to cursor control or insertion-point movement mode, whereas fast, open-loop, ballistic motions may be inferred as an intent to input gestures, which may involve linear stroke gestures and/or shape-writing gestures.

In accordance with example techniques discussed herein, in a closed-loop fine positioning mode, various cursor (or insertion point) placement control functions may be employed, including but not limited to:

(1) Absolute (but indirect) placement based on distance moved.
(2) Proportional (relative) placement based on a gain factor times the distance moved.
(3) Proportional or Absolute control up to a fixed movement distance threshold, with a different control function after that movement threshold. For example, tap and hold with timing-based auto-repeat is one such function. For example, tap and hold with pressure-sensitive auto-repeat is another. Auto repeat is a function of pressure.
(4) Proportional control with a transfer function based on finger movement distance and velocity, for example, in a manner similar to the ballistic control implemented for mouse pointer motion on WINDOWS XP.
(5) A mix of proportional and absolute control based on finger movement. For example, discussion of example implementations of such control is available in commonly owned U.S. Pat. Nos. 7,202,857 and 6,707,449, each entitled "Manual controlled scrolling." For example, the basics of this approach (in the context of touchscreens) are outlined in Hinckley, et al., "New Applications for the Touchscreen in 2D and 3D Medical Imaging Workstations," In Proc. 1995 *SPIE Conference on Medical Imaging: Image Display* (SPIE Proceedings), Vol. 2431, Apr. 27, 1995, pp. 561-570.
(6) Any of the above, with grounding of insertion point discrete movements linked in whole or in part to the physical detents provided by the key impressions, for example, on the screen, or on the key impressions that can be felt on an indirect pressure- or touch-sensitive keyboard (e.g., the MICROSOFT SURFACE TOUCH-COVER).

As discussed in U.S. Pat. No. 6,707,449, in the context of scrolling discussed therein, in detecting movement on the keyboard (or gestures made over a keyboard, for proximity-aware keyboards), it may be desirable to ignore very small finger (or other input object) motions in certain circumstances. For instance, it may be desirable to ignore unintentional small movement by the user's finger on the touch-sensitive surface of the keyboard (or by a gesturing input object in proximity to a keyboard). This may be beneficial where, for instance, a user cannot control his or her finger to be absolutely still when holding the finger in one place on the touch-sensitive surface (or over a proximity-aware keyboard). This may also prevent a document from "swimming," or appearing to move slightly on the display screen, due to small variations in the sensor readings and/or twitching of the user's finger. When the user's finger is in contact with the surface of a keyboard (or in close proximity to a proximity-aware keyboard), the system may infer whether or not the user is intentionally moving his or her finger by use of a combination of different movement thresholds. The decision as to whether the user is intentionally moving the finger may be used as a building block for several other features and recognized gestures, such as gestures that may freeze scrolling and/or the onset of an auto-scrolling mode in some situations and/or dependent on user's data. For example, the decision may also depend on other parameters such as the environment (e.g., the system may sense that the user is on a bus with everything moving, and thus the threshold may be different, the system may sense that the slate is flat, differentiated from on the user's lap, or being held, etc.).

When the user first touches the touch-sensitive surface of the keyboard (or moves an input object into close proximity with a proximity-aware keyboard), as detected, the user's finger position may be considered to be not moving on the keyboard. The state of not moving may be an initial condition. The state of moving or not moving may be stored as a flag or using any other method to effectuate a "moving" or "not moving" state. If it is determined that the finger movement does not exceed a first threshold distance (e.g., a distance from the initial touch point) and/or speed (and/or acceleration) within an optional first timeout period, then the finger is still considered to be not moving on the keyboard, and the determination of whether the first threshold is continued. On the other hand, where the finger motion exceeds the first threshold within the first timeout period, the finger is then considered to be moving (the "moving" state), and a flag may be set accordingly. This flag may be stored. The first threshold, when defined as a distance, may be defined as a set length (e.g., millimeters or inches, pixels), set speed (e.g., millimeters per second, pixels per second), set percentage of the scrolling region length, or any combination or sub combination of these. For example, the first threshold may be set at approximately 1% of the scrolling region length of the keyboard input area. The system continues to consider the finger as moving until a second timeout expires during which total movement of the finger is less than a second threshold distance and/or speed.

For example, the first and second timeouts may be the same or they may be different. For instance, the second timeout may be approximately twice the first timeout (e.g., the first timeout may be approximately 200 milliseconds and the second timeout may be approximately 400 milliseconds). Further, the second threshold may be approximately 0.5% of the length of the scrolling device. Although the second threshold be smaller than the first threshold, the second threshold may be identical to the first threshold or even larger than the first threshold. If the finger movement is less than the second threshold, the finger once again may be considered to be not moving (the "not moving" state), and a flag may be set accordingly. If the finger movement exceeds the second threshold, then the finger may still be considered to be moving, and the process continues with another delay being timed. Some or all of these steps may be performed serially or in parallel, may be combined as single steps, and/or may be further subdivided into additional sub-steps. Although the discussion above includes two thresholds, one skilled in the art of computing devices will understand that any number of thresholds may be used (e.g., as many thresholds as desired or needed).

Sometimes when the user removes his or her finger from the touch-sensitive surface of the keyboard (otherwise referred to herein as "lift-off" or "release"), the user's finger may unintentionally affect or disturb a current position. The effects of this can be reduced by maintaining a FIFO (first-in, first-out) queue of recent finger positions. The FIFO queue may be stored by the system, such as in a storage device and/or in memory. When the user breaks contact with the touch-sensitive surface of the keyboard, the system may search back through the queue to look for a sample where motion came to a definite (or near) stop. If such a sample is found, the current position may be adjusted to occur at that stop point. Thus, where it appears that the user's intent was to stop, then the position would be adjusted according to the user's apparent intent.

On the other hand, if no such sample is found in the queue that indicates an intended stop, or if the amount (distance) of the correction is larger than a threshold amount (measured by distance and/or percentage of the length), then the position may be not adjusted. The reason for rejecting a large correction is this indicates that the user probably was moving his or her finger relatively quickly when the user let go of the touch-sensitive surface of the keyboard. This is not an uncommon phenomenon as the resistance or drag of the finger may be expected to be naturally reduced during the lift-off process. Accordingly, not changing the position in such a circumstance may be beneficial because the user intends rapid motion, and undoing that motion may counter the user's intent.

In the context of "scrolling," U.S. Pat. No. 6,707,449 discusses auto-scrolling rate determination, such as based on finger pressure or contact area, as follows.

Many different functions for mapping the rate of scrolling to the user's input are possible. For example, the system may use a fixed rate of scrolling and/or a variable rate of scrolling based on various factors such as finger speed, finger pressure/contact area, length of hold, number of taps, and/or frequency of taps. If a fixed rate of scrolling is used, the fixed rate may have a default value, may be user-selectable, and/or may be selectable by the software application that is manipulating/editing a document. A variable rate of scrolling may allow the user to continuously adjust the scrolling rate as he or she scans through the document. The capability to continuously adjust the scrolling rate may provide a more controllable and predictable scroll interface.

For example, a variable rate of scrolling may be used based upon finger pressure against the touch-sensitive surface of the scrolling device. Finger pressure may be measured directly and/or be a function of measured finger contact area upon the touch-sensitive surface of the device. In such an implementation, an algorithm may be used that normalizes for the amount of finger contact on the current scrolling action and/or performs an exponential transformation of the finger contact area to provide a controllable range of scrolling speeds between slow and fast scrolling. For example, since users' fingers may have different sizes, the system may automatically measure a finger's size on touch down, when the user taps on the display. The scrolling rate may be calculated in two steps. For instance, for each sample of finger pressure on the touch-sensitive surface of the device, the following variable P may first be calculated:

$$P = K_3 ((p/p_0) - 1) \qquad (1)$$

where P is the normalized pressure estimate based on contact area, $K_3$ is a gain factor, p is the current pressure reading, and $p_0$ is the pressure chosen for the minimum-rate point described below.

Next, the result of equation (1) may be used to calculate the rate of scrolling for the current sampled finger pressure:

$$dy/dt = K_4 (e^{P+1} - e + 1) \qquad (2)$$

where $K_4$ is a gain factor and dy/dt is the resulting calculated rate of scrolling (t represents time). Thus, using such an equation, the rate of scrolling of the document is a nonlinear function of the finger contact area and/or pressure. If dy/dt is less than zero, then dy/dt may be set to zero. Further, if dy/dt is greater than a threshold, dy/dt may be set to that threshold. When the scrolling rate dy/dt is applied to the scrolling of the document, a positive value of dy/dt may be used for scrolling down (for instance), and to scroll up dy/dt may be multiplied by minus-one.

For example, the system may determine which of the regions of the device are being touched, and different values of the gain factors $K_3$ and/or $K_4$ may be used for auto-scrolling in opposing directions depending upon which active region is being touched. For instance, the auto-scrolling up and the auto-scrolling down regions may be associated with different gain factors $K_3$ and/or $K_4$. Depending upon the particular shape of the touch-sensitive surface, the shape of any bezel or other divider that may separate the scrolling region from the auto-scrolling regions, and whether auto-scrolling occurs in regions physically separate from the scrolling region, different amounts of contact between the user's finger and the auto-scrolling up regions than the auto-scrolling down region may occur. For instance, the user's finger may, during normal use of a scrolling strip, be expected to be at a slightly different angle when contacting an active region for up-scrolling than when contacting an active region for down-scrolling, causing the amount of surface contact to be greater when the finger is extended than when the finger is curled. Accordingly, the values of the gain factors $K_3$ and/or $K_4$ may be set to compensate for this difference such that up auto-scrolling and down auto-scrolling have a similar feel and response as compared to each other. Gain factor $K_4$ is in units of scrolling speed, such as pixels per second, centimeters per second, or text lines per second. The value dy/dt may also have the same units as $K_4$.

The choice of an appropriate value for the $p_0$ minimum-rate point is discussed below, as ways of determining the value of $p_0$ are possible. For example, the dynamics of the current user gesture itself may be used to determine a value of $p_0$ in real time as the user is attempting to specify a rate of scrolling. For instance, the finger pressure against the touch-sensitive surface of the device for the minimum rate point may be sampled following an optional delay after initial contact. The delay may be long enough for the user to establish firm initial contact with the touch-sensitive surface, such as about 200 milliseconds. During this delay, the current value of the finger pressure may be continuously measured and used as a preliminary estimate for $p_0$, so that the user may start scrolling with minimal perceptible delay.

A maximum threshold on the rate of scrolling may alternatively or additionally be imposed. Also, a sliding window may be used that represents the range of anticipated future pressure values p, which may be based on one or more previous pressure values p. Where the computation of dy/dt as shown above results in a rate larger than the maximum threshold, the value for $p_0$ may be recomputed by sliding the window upward in pressure values such that the current pressure value p would result in the maximum threshold rate of scrolling. On the other hand, if the finger pressure falls below the bottom of the window, the value of $p_0$ may be recomputed by sliding the window downward. The known range of pressure values that may be sensed by the device may be used as a basis for choosing initial default minimum and maximum pressures of the window. The rate limits and/or pressure maximum criteria described below may be used in such a sliding-window strategy. For example, such a sliding-window technique allows the system to automatically self-calibrate for different users where some have a heavy touch or large fingers as compared to other users who have a light touch or smaller fingers.

For example, rate limits may be utilized to improve the selection of the $p_0$ minimum-rate point. A maximum and/or minimum rate of movement may be imposed on the above equations such that if a rate limit is exceeded, the $p_0$ minimum-rate point is recalculated to satisfy the limit. This may have the effect of adapting the sensed pressures to the user's gesture and typical reading speeds. Also, because many touch-sensitive pads actually sense finger contact area in order to determine finger pressure, there is often a practical limit on how much "pressure" can be applied. Knowledge of typical such maximum pressure values can be used to help choose the $p_0$ minimum-rate point. For example, if the user starts by pressing hard against the touch-sensitive surface of the device, then the document may immediately scroll quickly where the system knows that the user will not be able to further increase the contact area.

For example, the pressure maximum or the parameters in the above equations may differ for different active regions, since the typical contact area of the user's finger with different regions in different locations may be expected to vary. In other words, the scroll rates in different directions may be different per unit of finger pressure applied to the touch-sensitive surface of the device. Adjustments to the parameters depending upon the area touched on the touch-sensitive sensitive surface of the device may make the pressure response appear more consistent.

One skilled in the art of computing devices will appreciate that such techniques as discussed above in the context of scrolling may also be applied in other contexts, such as gesturing for other purposes.

One skilled in the art of computing devices will appreciate that many other types of data input properties may be used for the disambiguation, without departing from the spirit of the discussion herein.

One skilled in the art of computing devices will appreciate that there may be many ways to accomplish the disambiguation of keyboard input discussed herein, without departing from the spirit of the discussion herein.

II. Example Operating Environment

Features discussed herein are provided as example embodiments that may be implemented in many different ways that may be understood by one of skill in the art of computing devices, without departing from the spirit of the discussion herein. Such features are to be construed only as example embodiment features, and are not intended to be construed as limiting to only those detailed descriptions.

Figure 12:
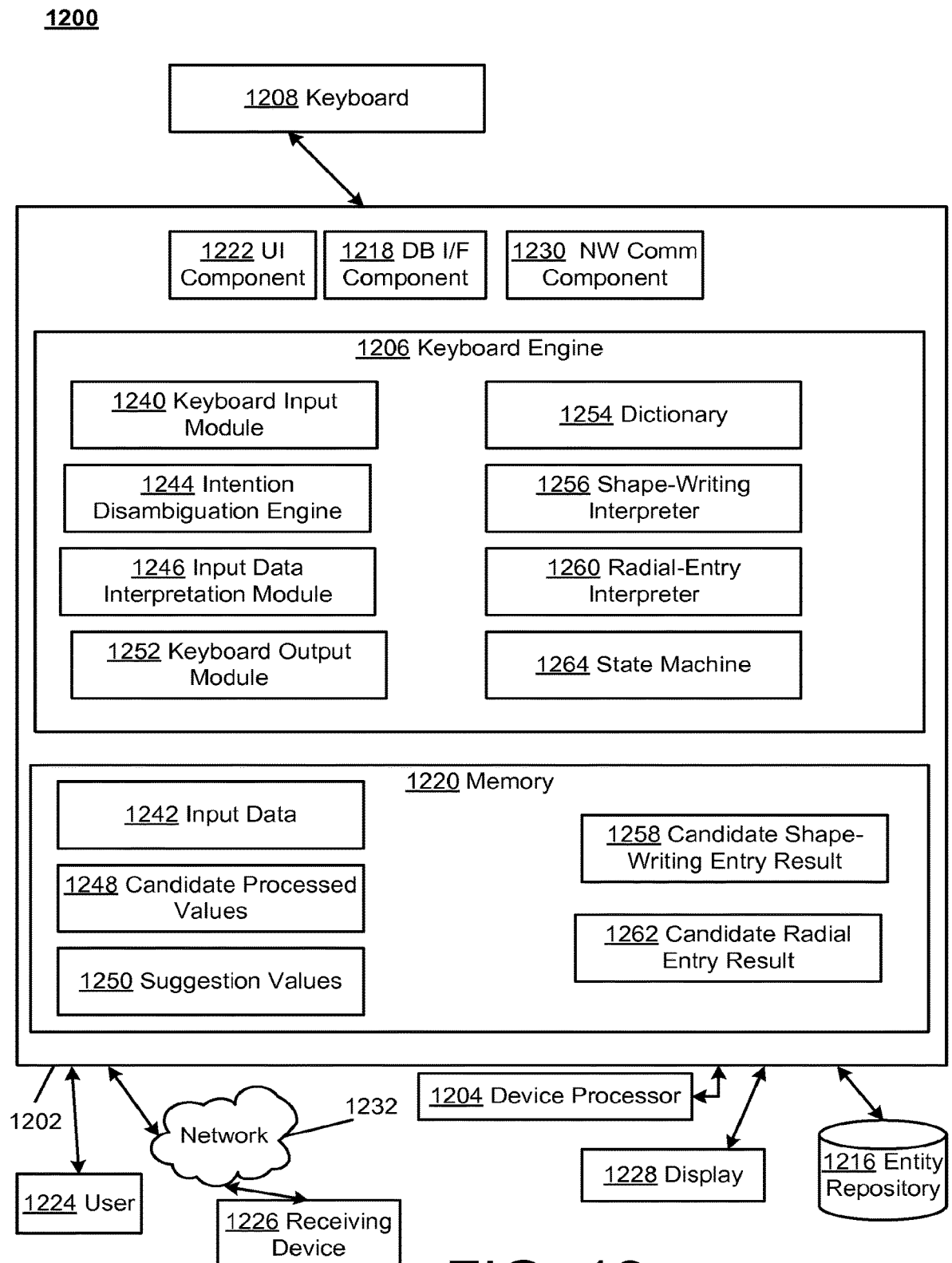
FIG. 12 is a block diagram illustrating an example generalized system for disambiguating keyboard entry modes.

As further discussed herein, FIG. 12 is a block diagram of a generalized system 1200 for disambiguating keyboard entry modes. The generalized system 1200 as shown is merely intended to illustrate various example functionality that may be included in example systems as discussed herein, and is not intended to be limiting in terms of implementations in various hardware and/or software configurations.

For example, the system 1200 may include an apparatus that includes a keyboard engine 1206 comprising a computer readable storage medium storing instructions for execution by at least one processor. As shown in FIG. 12, the system 1200 may include a device 1202 that includes at least one processor 1204.

The device 1202 may include a keyboard engine 1206 that may operate a keyboard 1208 that accepts shape-writing input and radial entry input. For example, although shown external to the device 1202 in FIG. 12, the device 1202 may include (e.g. house) the keyboard 1208. The keyboard engine 1206 may operate a keyboard 1208 that accepts shape-writing input and radial entry input simultaneously, so that a user may seamlessly use either type of entry (as well as tap mode) without a need to specifically toggle between modes (e.g., via toggling keys or functions). For example, the keyboard engine 1206 may support radial gesture input in either tap mode or shape-writing mode.

For example, a graphical or printed keyboard 1208 may be presented to facilitate user input. For example, the keyboard 1208 may occupy all of or almost all of the entire touch-sensitive area (or gesture-sensitive area), and thus none of the keyboard depictions shown or discussed herein are intended to represent any physical scale, size or orientation of the various components represented therein. The touch sensitive area (or gesture-sensitive area) may be of any type, including multi-touch and/or pen touch. The touch sensitive area may be a touch sensitive screen, or a pressure/capacitive or other sensor beneath a printed keyboard, or a proximity-aware keyboard (physical and/or virtual). Further, mouse input may be used with the keyboard 1208.

One skilled in the art of computing devices will understand that there are numerous forms of keyboards, without departing from the spirit of the discussion herein.

According to an example embodiment, the keyboard engine 1206, or one or more portions thereof, may include executable instructions that may be stored on a tangible computer-readable storage medium, as discussed below. According to an example embodiment, the computer-readable storage medium may include any number of storage devices, and any number of storage media types, including distributed devices.

In this context, a "processor" may include a single processor or multiple processors configured to process instructions associated with a processing system. A processor may thus include one or more processors processing instructions in parallel and/or in a distributed manner. Although the device processor 1204 is depicted as external to the keyboard engine 1206 in FIG. 12, one skilled in the art of computing devices will appreciate that the device processor 1204 may be implemented as a single component, and/or as distributed units which may be located internally or externally to the keyboard engine 1206, and/or any of its elements.

For example, the system 1200 may include one or more processors 1204. For example, the system 1200 may include at least one tangible computer-readable storage medium storing instructions executable by the one or more processors 1204, the executable instructions configured to cause at least one computing apparatus (e.g., a computing device) to perform operations associated with various example components included in the system 1200, as discussed herein. For example, the one or more processors 1204 may be included in the at least one computing apparatus (e.g., a computing device). One skilled in the art of computing devices will understand that there are many configurations of processors and computing apparatuses that may be configured in accordance with the discussion herein, without departing from the spirit of such discussion.

In this context, a "component" or "engine" may refer to executable instructions or hardware that may be configured to perform certain operations, with hardware assistance. Such instructions may be included within component groups of instructions, or may be distributed over more than one group. For example, some instructions associated with operations of a first component may be included in a group of instructions associated with operations of a second component (or more components). For example, a "component" or "engine" herein may refer to a type of computational entity configured with functionality that may be implemented by executable instructions that may be located in a single entity, or may be spread or distributed over multiple entities, and may overlap with instructions and/or hardware associated with other components. In this context, "executable" instructions refer to instructions that are specifically configured for execution by one or more hardware devices, and do not refer to software per se.

According to an example embodiment, the keyboard engine 1206 may be implemented in association with one or more user devices. For example, the keyboard engine 1206 may communicate with one or more servers, as discussed further below.

For example, an entity repository 1216 may include one or more databases, and may be accessed via a database interface component 1218. One skilled in the art of computing devices will appreciate that there are many techniques for storing repository information discussed herein, such as various types of database configurations (e.g., relational databases, hierarchical databases, distributed databases) and non-database configurations.

According to an example embodiment, the keyboard engine 1206 may include a memory 1220 that may, for example, store intermediate data for the keyboard engine 1206. In this context, a "memory" may include a single memory device or multiple memory devices configured to store data and/or instructions. Further, the memory 1220 may span multiple distributed storage devices.

According to an example embodiment, a user interface component 1222 may manage communications between a user 1224 and the keyboard engine 1206. The user 1224 may be associated with a receiving device 1226 that may be associated with a display 1228 and other input/output devices. For example, the display 1228 may be configured to communicate with the receiving device 1226, via internal device bus communications, or via at least one network connection. For example, the display 1228 may be directly connected to the receiving device 1226.

According to example embodiments, the display 1228 may be implemented as a flat screen display, a print form of display, a two-dimensional display, a three-dimensional display, a static display, a moving display, sensory displays such as tactile output, audio output, and any other form of output for communicating with a user (e.g., the user 1224).

According to an example embodiment, the keyboard engine 1206 may include a network communication component 1230 that may manage network communication between the keyboard engine 1206 and other entities that may communicate with the keyboard engine 1206 via at least one network 1232. For example, the network 1232 may include at least one of the Internet, at least one wireless network, or at least one wired network. For example, the network 1232 may include a cellular network, a radio network, or any type of network that may support transmission of data for the keyboard engine 1206. For example, the network communication component 1230 may manage network communications between the keyboard engine 1206 and the receiving device 1226. For example, the network communication component 1230 may manage network communication between the user interface component 1222 and the receiving device 1226. For example, the device 1202 may be self-contained, with processors, displays, storage, etc. all included in a single hardware entity (e.g., a tablet, slate, etc.). For example, the device 1202 may be a self-contained touchscreen device.

The keyboard engine 1206 may include a keyboard input module 1240 that obtains input data 1242 from at least one input sensor of the keyboard 1208.

An intention disambiguation engine 1244 enables simultaneous use of the shape-writing input and the radial entry input acceptance for a user of the keyboard 1208.

For example, an input data interpretation module 1246 may analyze the input data 1242 and provide one or more candidate processed values 1248 that include one or more of a candidate shape-writing input result, or a candidate radial entry input result.

For example, the intention disambiguation engine 1244 may provide a plurality of suggestion values 1250, based on the one or more candidate processed values 1248.

For example, the plurality of suggestion values 1250 may include a candidate shape-writing input result and a candidate radial entry input result, wherein the keyboard engine 1206 may further include a keyboard output module 1252 that provides a display of the suggestion values, wherein the display of the candidate radial entry input result provides a graphical indication specifically indicating an inference of a radial entry input associated with the candidate radial entry input result.

For example, the input data interpretation module 1246 may analyze the input data 1242 to determine a candidate radial entry input result by determining whether the input data includes keyboard input indicating a short-stroke input in a radial area of the keyboard.

For example, a dictionary 1254 may omit entries for low-frequency terms that are determined as terms that occur with a low frequency, wherein the input data interpretation module 1246 may analyze the input data to provide the one or more candidate processed values 1248, using the dictionary 1254.

For example, a shape-writing interpreter 1256 may analyze the input data 1242 and provide one or more candidate shape-writing results 1258 using the input data 1242.

For example, a radial-entry interpreter 1260 may analyze the input data 1242 and provide one or more candidate radial-entry results 1262 using the input data. For example, the radial-entry interpreter 1260 may provide radial-entry results and/or nested (e.g., hierarchical, multi-level) radial-entry results (e.g., one or more of the radial menu items may have sub-menus).

For example, a state machine 1264 may track modes of input to the keyboard engine 1206.

For example, the keyboard 1208 may include a pressure-sensitive keyboard, a touch-sensitive keyboard, or a proximity-aware keyboard.

For example, the keyboard 1208 may include a virtual keyboard.

For example, the keyboard 1208 may include a low-travel mechanical keyboard with touch-sensitive keys, or a purely touch-sensitive keyboard.

For example, the keyboard 1208 may include a keyboard with a plurality of keys substantially omitted and replaced by short-stroke input functionality.

For example, a graphical or printed keyboard may be provided on a pressure-sensitive or touch-sensitive surface, for receiving tap input and gesture input. For example, the keyboard 1208 may be configured with a removed or omitted key set comprising at least one omitted or substantially omitted key, in which each key of the omitted key set corresponds to a character, action, or command code that is enterable via a gesture.

For example, the keyboard 1208 may be translucent to provide full visibility of a screen that is underneath the keyboard display.

For example, the keyboard 1208 may include alphabetic keys and numeric keys in a same-sized or substantially same-sized touch-sensitive area relative to a different keyboard that includes alphabetic keys and does not include numeric keys, and in which the keyboard and the different keyboard have same-sized or substantially same-sized alphabetic keys. The keyboard 1208 may be provided by omitting one or more keys from the keyboard that are made redundant by gesture input. The keyboard 1208 may also include numeric keys in a typical numeric keypad arrangement, placed either to the right or the left of the keyboard; such an arrangement may be advantageously desirable when the keyboard is displayed in landscape screen orientation (but perhaps not in portrait orientation). For example, the size of the keyboard 1208 may be adjustable according to the display device size and landscape\portrait orientation.

For example, data corresponding to interaction with a key of the keyboard 1208 may be received, in which at least one key represents multiple characters (including letters, numbers, special characters and/or commands). If the data indicates that the interaction represents a first gesture, a first character value is inferred. If the data indicates that the interaction represents a second gesture (that is different from the first gesture), a second character value is inferred. If the data indicates that the interaction represents a tap, a tap-related character value represented by the key may be inferred.

Various example techniques discussed herein may generally involve touch-sensitive graphical or printed keyboards in which gestures may replace certain keys on the keyboard. For example, the replaced keys may be made unnecessary (or otherwise redundant) by the gestures. For example, the omission or removal of otherwise redundant keys may allow for providing more keys on the keyboard in the same touch-sensitive area, providing larger keys in the same touch-sensitive area, and/or reducing the amount of touch-sensitive area occupied by the keyboard.

As an example, tapping on any alphabetic key of the keyboard 1208 may output the lower-case character associated with that key, whereas an upward stroke initiated on the same key may output the shifted value (e.g., uppercase) of the associated character being output, thus avoiding the need for a separate tap on a Shift key. For example, a stroke to the right initiated anywhere on the keyboard 1208 may output a Space. Similarly, a stroke to the left, initiated anywhere on the keyboard may output a Backspace, while one slanting down to the left (e.g., initiated anywhere on the keyboard) may output Enter. For example, the stroke gestures may be enabled on a central cluster of alphanumeric characters, whereas one or more peripheral keys (e.g., specific keys, such as backspace or Ctrl, or specific regions, such as a numeric keypad or touch-pad area for cursor control (if any), may have different or just partially overlapping stroke gestures assigned to them, including no gestures at all, e.g., in the case of cursor control from a touchpad starting region). Thus, the stroke menus may be spatially multiplexed (e.g., potentially different from some keys, or for certain sets of keys, or for all keys). Also, keys near the keyboard 1208 edge, where gestures in certain directions may not be possible due to lack of space (e.g. a right stroke from a key on the right edge of the surface, for a keyboard whose right side is placed very close to the bezel), whereby the user may start a gesture more from the center to enter the input (or further away from the edge).

Furthermore, in some example implementations, additional key modifiers (such as Ctrl, Alt, WINDOWS Key (Start key), the Right-Menu key, etc.) may be available by single or multi-touch stroke gestures on the radial menu(s) associated with the keyboard or individual keys, in addition to, or in lieu of, the Space, Backspace, Shift, and Enter strokes as discussed above.

One skilled in the art of computing devices will appreciate that gestures also may be used to input other non-character actions (not only backspace), such as user interface commands in general (e.g., Prev/Next fields in form-filling, Go commands, Search commands, etc.) which sometimes have representations on soft keyboards. Further, richer or more general commands (such as Cut/Copy/Paste) may also be entered by gestures, macros may be invoked by gestures, etc. As discussed herein, intuitive gestures (e.g., stroke right for Space) may advantageously provide ease in learning and remembering the gestures.

As discussed herein, gestures may generally be based upon Up-Down-Right-Left (e.g., North-South-East-West, or N-S-E-W) directions of a displayed keyboard. However, the directional axis may be rotated an amount (in opposite, mirrored directions), particularly for thumb-based gestures, because users intending to gesture up with the right thumb may tend to gesture more Up-Right (e.g., NE, depending on a current orientation of the device) or Up-Up-Right (e.g., North-NorthEast). Similarly, the left thumb may tend to gesture more Up-Left (e.g., NW) or Up-Up-Left (e.g., North-NorthWest). Further, the orientation of the device may also be compensated. For example, if a user is holding the device a bit sidewise, a gesture up may be used as a signal to continue to perform a shift even though on the reference of the device the gesture is moving Up-Left or Up-Right, depending on the orientation of the device. Determination of such orientation adjustments may consider the orientation of the tablet as determined by one or more inertial sensors (e.g., including accelerometers, gyroscopes, and/or magnetometers), and/or other types of sensors (e.g. vision based sensors, etc.).

In this context, a "graphical" keyboard may refer to a keyboard that is rendered on a visible "surface," for example, a touch-sensitive display surface or proximity-aware surface, and that may therefore programmatically change its appearance. In this context, a "printed" keyboard may refer to a keyboard that is associated with a pressure sensitive, or similar, surface (e.g., built into the cover of a slate or tablet computing device) that is not programmatically changeable in appearance, e.g., a keyboard printed, embossed, physically overlaid as a template or otherwise affixed or part of a pressure sensitive surface, or proximity-aware surface. As will be understood, the keyboards described herein generally may include graphical keyboards or printed keyboards, and/or hybrid keyboards (e.g., printed keyboards with one or more displays and/or touchscreens on them), and/or virtual keyboards generally.

In accordance with example techniques discussed herein, additional gestures may allow a single displayed key to represent multiple characters, e.g., three or four (or more). In this context, a "character" may refer to anything that may be entered into a system via a key, including alphabetic characters, numeric characters, symbols, special characters, and commands. For example, a key may enable input for one character for a "tap" input, and three characters for three differentiated upward gestures, such as one for a generally upward-left gesture, one for a generally straight up gesture, and one for a generally upward-right gesture.

For example, a radial area around a key may be enabled to provide different types of input, depending on various gestures that may be input in the radial area. As an example, the area surrounding (or in close proximity to) a key may be divided into geometrically arranged sections (e.g., eight sections) such that gestures made with regard to the various sections may be understood to have various differentiated meanings (i.e., providing different keyboard inputs). Further, the area surrounding the key may be very large.

For example, a gesture may be the same as another, existing gesture, with the two similar/like gestures distinguished by their starting locations on the keyboard, or gestures that cross the surface boundary (bezel), for example.

Different gestures other than and/or in addition to one or more of those discussed herein may also be used. Additionally, the gestures may be "air" gestures, not necessarily on a touch-sensitive surface, such as sensed by a KINECT device, infrared proximity sensors, non-contact capacitive sensing, or other similar device. For example, such "air" gestures may be used with a virtual keyboard. There may also be gestures where a user begins by touching the display and stroking (e.g., in one of the directions of the radial menu) while going in the air, which may be distinguished from the same gesture while staying in contact with the display. As another example, mouse input may be used.

As another example, while finger input may be discussed herein, a mechanical intermediary such as a plastic stick/stylus or a capacitive pen, or a battery-powered or inductively coupled stylus are some possible alternatives that may be used. As another example, other objects may be used for providing such "air" gestures. Further, the input may be refined, (e.g., hover feedback may be received for the gestural commands superimposed on the keys), and/or different length and/or accuracy constraints may be applied on the stroke gesture depending on whether a pen or finger is known to be performing the interaction (which may be detected by a contact area, and/or by using a different digitizer for the pen and for touch, and/or by distinguishing the pen from touch using depth cameras, and/or using other technologies that enable distinguishing between pen and touch). Therefore one skilled in the art of computing devices will appreciate that the discussion herein is not limited to any particular embodiments, aspects, concepts, structures, functionalities or examples described herein. Rather, any of the embodiments, aspects, concepts, structures, functionalities or examples described herein are non-limiting, and the present invention may be used various ways that may provide benefits and advantages in computers and keyboard and gesture technology in general.

One skilled in the art of computing devices will appreciate that many different techniques may be used for disambiguating keyboard gesture input, without departing from the spirit of the discussion herein.

III. Flowchart Description

Features discussed herein are provided as example embodiments that may be implemented in many different ways that may be understood by one skilled in the art of computing devices, without departing from the spirit of the discussion herein. Such features are to be construed only as example embodiment features, and are not intended to be construed as limiting to only those detailed descriptions.

Figure 13A:
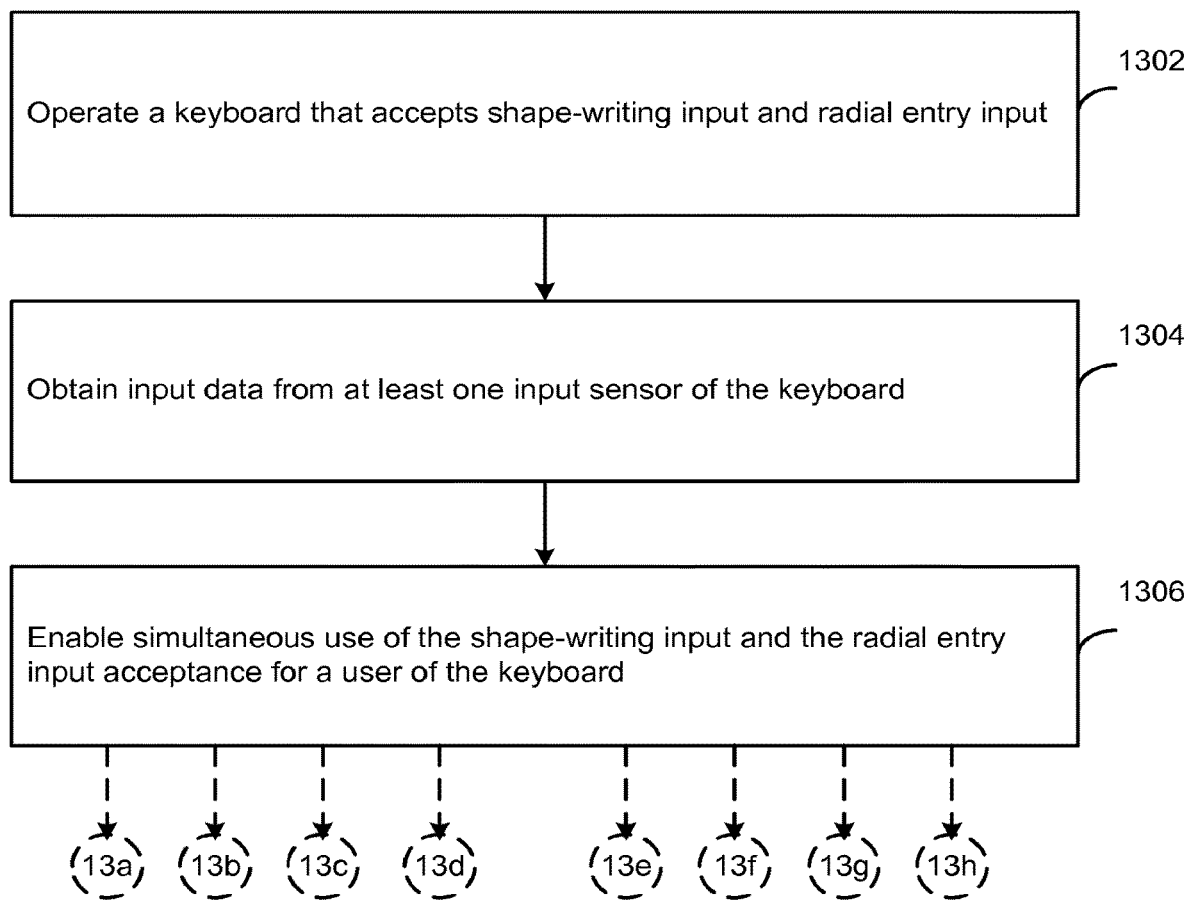
FIGS. 13A-13C are a flowchart illustrating example operations of the system of FIG. 12.
Figure 13B:
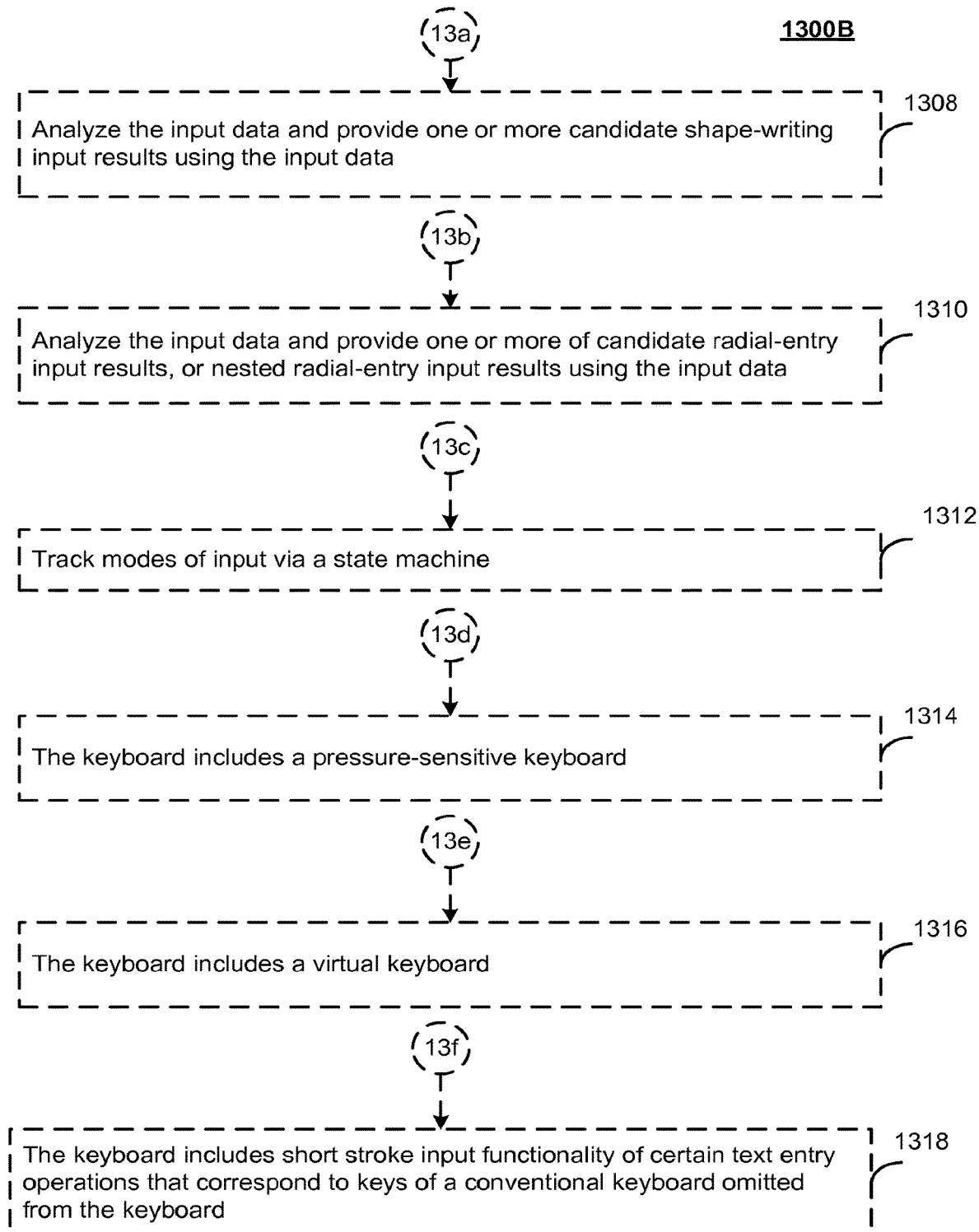
Figure 13C:
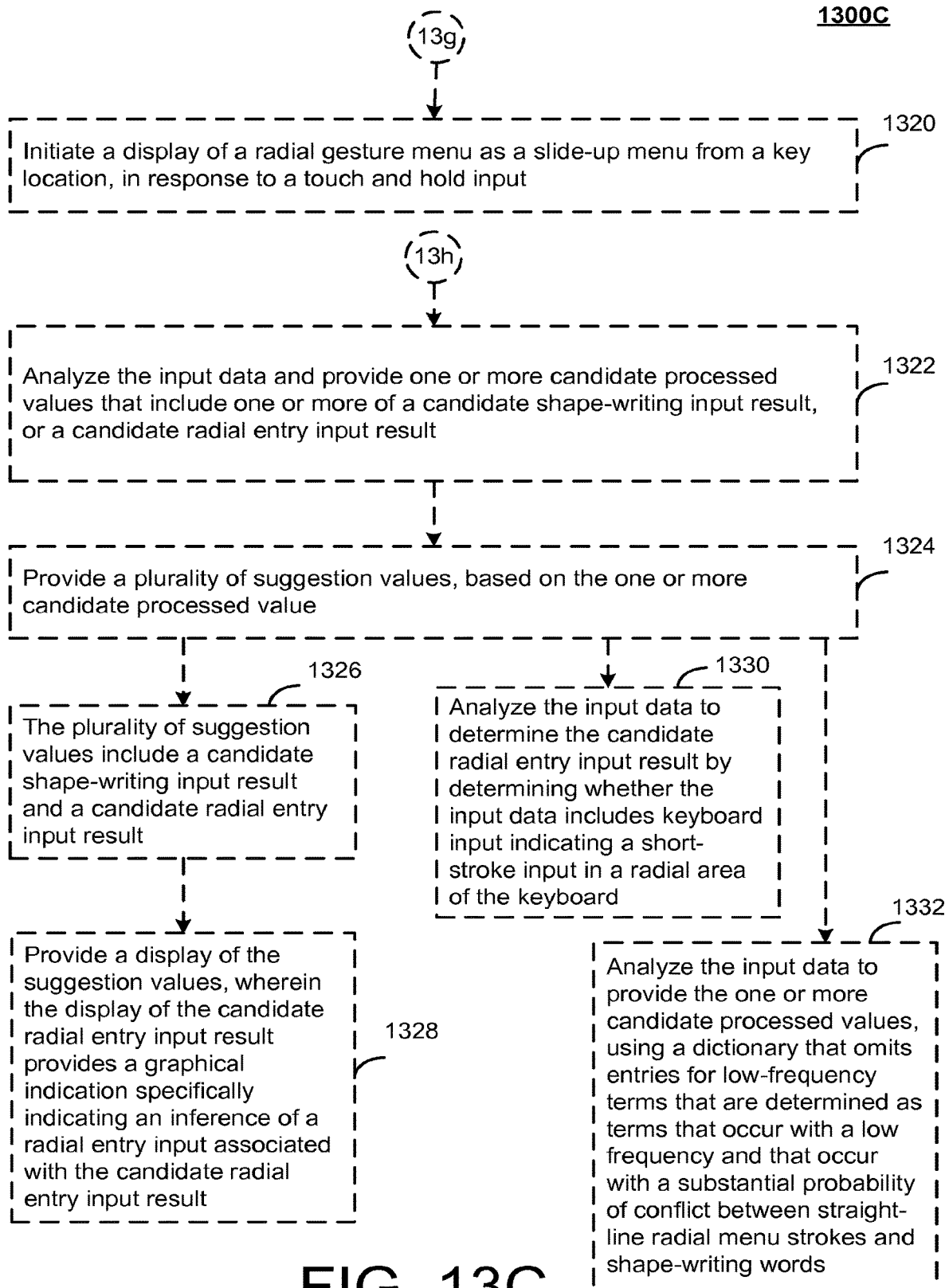

FIGS. 13A-13C are a flowchart illustrating example operations of the system of FIG. 12, according to example embodiments. In the example of FIG. 13A, a keyboard may be operated to accept shape-writing input and radial entry input (1302).

Input data may be obtained from at least one input sensor of the keyboard (1304).

Simultaneous use of the shape-writing input and the radial entry input acceptance may be enabled for a user of the keyboard (1306).

For example, the input data may be analyzed and one or more candidate shape-writing input results may be provided using the input data (1308), in the example of FIG. 13B.

For example, the input data may be analyzed and one or more of candidate radial-entry input results, or nested radial-entry input results may be provided, using the input data (1310).

For example, modes of input may be tracked via a state machine (1312).

For example, the keyboard may include a pressure-sensitive keyboard (1314).

For example, the keyboard may include a virtual keyboard (1316).

For example, the keyboard may include short stroke input functionality of certain text entry operations that correspond to keys of a conventional keyboard omitted from the keyboard (1318).

For example, a display of a radial gesture menu may be initiated, as a slide-up menu from a key location, in response to a touch and hold input (1320), in the example of FIG. 13C.

For example, the input data may be analyzed and one or more candidate processed values may be provided that include one or more of a candidate shape-writing input result, or a candidate radial entry input result (1322).

For example, a plurality of suggestion values may be provided, based on the one or more candidate processed values (1324).

For example, the plurality of suggestion values may include a candidate shape-writing input result and a candidate radial entry input result (1326).

For example, a display of the suggestion values may be provided, wherein the display of the candidate radial entry input result provides a graphical indication specifically indicating an inference of a radial entry input associated with the candidate radial entry input result (1328).

For example, the input data may be analyzed to determine the candidate radial entry input result by determining whether the input data includes keyboard input indicating a short-stroke input in a radial area of the keyboard (1330).

For example, the input data may be analyzed to provide the one or more candidate processed values, using a dictionary that omits entries for low-frequency terms that are determined as terms that occur with a low frequency and that occur with a substantial probability of conflict between straight-line radial menu strokes and shape-writing words (1332).

One skilled in the art of computing devices will understand that there may be many ways of disambiguating input keyboard gestures, without departing from the spirit of the discussion herein.

IV. Aspects of Certain Embodiments

Features discussed herein are provided as example embodiments that may be implemented in many different ways that may be understood by one of skill in the art of computing devices, without departing from the spirit of the discussion herein. Such features are to be construed only as example embodiment features, and are not intended to be construed as limiting to only those detailed descriptions.

For example, a system includes an apparatus that includes at least one device processor and a keyboard engine that operates a keyboard that accepts shape-writing input and radial entry input, via the at least one of the at least one device processor. The keyboard engine includes a keyboard input module that obtains input data from at least one input sensor of the keyboard, and an intention disambiguation engine that enables simultaneous use of the shape-writing input and the radial entry input acceptance for a user of the keyboard.

The keyboard engine further includes an input data interpretation module that analyzes the input data and provides one or more candidate processed values that include one or more of a candidate shape-writing input result, or a candidate radial entry input result, wherein the intention disambiguation engine provides a plurality of suggestion values, based on the one or more candidate processed values.

The plurality of suggestion values include a candidate shape-writing input result and a candidate radial entry input result.

The keyboard engine further includes a keyboard output module that provides a display of the suggestion values, wherein the display of the candidate radial entry input result provides a graphical indication specifically indicating an inference of a radial entry input associated with the candidate radial entry input result.

The input data interpretation module analyzes the input data to determine the candidate radial entry input result by determining whether the input data includes keyboard input indicating a short-stroke input in a radial area of the keyboard.

The apparatus further includes a dictionary that omits entries for low-frequency terms that are determined as terms that occur with a low frequency and that occur with a substantial probability of conflict between straight-line radial menu strokes and shape-writing words, wherein the input data interpretation module analyzes the input data to provide the one or more candidate processed values, using the dictionary.

The keyboard engine further includes a shape-writing interpreter that analyzes the input data and provides one or more candidate shape-writing input results using the input data.

The keyboard engine further includes a radial-entry interpreter that analyzes the input data and provides one or more of candidate radial-entry input results, or nested radial-entry input results using the input data.

The keyboard engine further includes a state machine that tracks modes of input to the keyboard engine.

The keyboard includes a pressure-sensitive keyboard.

The keyboard includes a virtual keyboard.

The keyboard includes short stroke input functionality of certain text entry operations that correspond to keys of a conventional keyboard omitted from the keyboard.

Input data from a keyboard that accepts shape-writing input and radial entry input is obtained.

Simultaneous use of the shape-writing input and the radial entry input acceptance is provided for a user of the keyboard, via a device processor, by disambiguating the input data to distinguish between the shape-writing input and the radial entry input.

The input data is analyzed to provide one or more candidate processed values that include one or more of a candidate shape-writing input result, or a candidate radial entry input result.

A plurality of suggestion values are provided, based on the one or more candidate processed values.

The plurality of suggestion values include a candidate shape-writing input result and a candidate radial entry input result.

A display of the suggestion values is initiated, wherein the display of the candidate radial entry input result provides a graphical indication specifically indicating an inference of a radial entry input associated with the candidate radial entry input result.

Analyzing the input data includes analyzing the input data to determine the candidate radial entry input result by determining whether the input data includes keyboard input indicating a short-stroke input in a radial area of the keyboard.

A display of a radial gesture menu is initiated as a slide-up menu from a key location, in response to a touch and hold input.

A computer program product includes a computer-readable storage medium storing executable code that causes at least one computing device to obtain input data from a keyboard that accepts shape-writing input and radial entry input, and provide simultaneous use of the shape-writing input and the radial entry input acceptance for a user of the keyboard, by disambiguating the input data to distinguish between the shape-writing input and the radial entry input.

The executable code causes the at least one computing device to analyze the input data to provide one or more candidate processed values that include one or more of a candidate shape-writing input result, or a candidate radial entry input result, and provide a plurality of suggestion values, based on the one or more candidate processed values.

Customer privacy and confidentiality have been ongoing considerations in computing environments for many years. Thus, example techniques for disambiguating input keyboard gestures may use user input and/or data provided by users who have provided permission via one or more subscription agreements (e.g., "Terms of Service" (TOS) agreements) with associated applications or services associated with such techniques. For example, users may provide consent to have their input/data transmitted and stored on devices, though it may be explicitly indicated (e.g., via a user accepted agreement) that each party may control how transmission and/or storage occurs, and what level or duration of storage may be maintained, if any. Further, identifiers that may be used to identify devices used by a user may be obfuscated, e.g., by hashing actual user information. It is to be understood that any user input/data may be obtained in accordance with the privacy laws and regulations of any relevant jurisdiction.

Implementations of the various techniques described herein may be implemented in digital electronic circuitry, or in computer hardware, firmware, software, or in combinations of them (e.g., an apparatus configured to execute instructions to perform various functionality).

Implementations may be implemented as a computer program embodied in signals (e.g., a pure signal such as a pure propagated signal). Such implementations will be referred to herein as implemented via a "computer-readable transmission medium," which does not qualify herein as a "computer-readable storage medium" or a "computer-readable storage device" as discussed below.

Alternatively, implementations may be implemented via a computer program embodied in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, a computing apparatus (e.g., a data processing apparatus, a computing device), e.g., a programmable processor, a special-purpose processor or device, a computer, or multiple computers. Such implementations may be referred to herein as implemented via a "computer-readable storage medium" or a "computer-readable storage device" and are thus different from implementations that are purely signals such as pure propagated signals (and that thus do not qualify herein as a "computer-readable transmission medium" as discussed above). Thus, a reference herein to a "computer-readable storage medium" or a "computer-readable storage device" does not refer to a signal per se.

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and/or any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), light-emitting diode (LED) monitor, or plasma monitor, for displaying information to the user and a keyboard and a pointing device, e.g., a mouse or a trackball, by which the user can provide input to the computer. As discussed herein, tablets, touchscreens, slates, etc. may be used for input and display. Other kinds of devices can be used to provide for interaction with a user as well; for example, feedback provided to the user can be any form of sensory feedback, e.g., visual feedback, and/or auditory feedback, and/or tactile feedback. For example, output may be provided via any form of sensory output, including (but not limited to) visual output (e.g., visual gestures, video output), and/or audio output (e.g., voice, device sounds), and/or tactile output (e.g., touch, device movement), and/or temperature, and/or odor, etc.

Further, input from the user can be received in any form, including acoustic, and/or speech, or and/or tactile input. As discussed herein, input may be received from a pen or other input object. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., KINECT, stereoscopic camera systems, infrared camera systems, RGB (red, green, blue) camera systems and combinations of these), motion gesture detection using accelerometers/gyroscopes, magnetometers, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An apparatus comprising:
   at least one device processor; and
   at least one computer readable storage medium storing instructions which, when executed by the at least one device processor, cause the at least one device processor to:
   operate a keyboard configured to implement shape-writing of words, and individual character entry of primary characters and auxiliary characters associated with the primary characters;
   detect an input to the keyboard that is directed to a particular primary character;
   determine an amount of pressure of the input directed to the particular primary character;
   based at least on the amount of pressure of the input directed to the particular primary character, disambiguate whether the input is a shape-writing input to enter a particular word or an auxiliary character input to enter a particular auxiliary character other than the particular primary character to which the input is directed;
   in a first instance when the input is disambiguated as the shape-writing input based at least on the input having a soft force onset profile, enter the particular word, the particular word including the particular primary character; and
   in a second instance when the input is disambiguated as the auxiliary character input, enter the particular auxiliary character.

2. The apparatus of claim 1, the particular primary character having a plurality of associated auxiliary characters including the particular auxiliary character and one or more other auxiliary characters.

3. The apparatus of claim 2, wherein the instructions, when executed by the at least one device processor, cause the at least one device processor to:
   in the second instance, based at least on the amount of pressure of the input directed to the particular primary character, determine that the input comprises a tap and hold on the particular primary character; and
   responsive to determining that the input comprises the tap and hold on the particular primary character, display a menu identifying the plurality of associated auxiliary characters.

4. The apparatus of claim 3, wherein the instructions, when executed by the at least one device processor, cause the at least one device processor to:
   determine that, after the tap and hold, the input moved toward the particular auxiliary character on the displayed menu; and
   responsive to movement of the input toward the particular auxiliary character on the displayed menu, select the particular auxiliary character for entry in the second instance.

5. The apparatus of claim 1, wherein the instructions, when executed by the at least one device processor, cause the at least one device processor to:
   determine the amount of pressure of the input using a sampling rate of at least 1 kHz.

6. The apparatus of claim 1, wherein the instructions, when executed by the at least one device processor, cause the at least one device processor to:
   determine that the input has a sharp force onset profile in the second instance and disambiguate the input as the auxiliary character input based at least on the sharp force onset profile.

7. The apparatus of claim 1, wherein the instructions, when executed by the at least one device processor, cause the at least one device processor to:
   distinguish the shape-writing input from the auxiliary character input based at least on a stroke length of the input.

8. The apparatus of claim 1, wherein the instructions, when executed by the at least one device processor, cause the at least one device processor to:
   distinguish the shape-writing input from the auxiliary character input based at least on whether the input includes an inflection point.

9. A method performed by a computing device, the method comprising:
   providing a keyboard that accepts shape-writing of words and entry of individual characters;
   detecting touch input directed to a starting character on the keyboard, the starting character being associated with a plurality of auxiliary characters;
   determining an amount of pressure of the touch input directed to the starting character;
   based at least on the amount of pressure of the touch input directed to the starting character, disambiguating whether the touch input is a shape-writing input to enter a word beginning with the starting character or an auxiliary character input to enter a particular auxiliary character other than the starting character to which the touch input is directed;
   in a first instance when the touch input comprises a tap and hold on the starting character:
   disambiguating the touch input as the auxiliary character input;

displaying a menu identifying the plurality of auxiliary characters associated with the starting character to which the touch input is directed; and responsive to selection of the particular auxiliary character from the menu via the touch input, entering the particular auxiliary character on the computing device; and in a second instance when the touch input passes through one or more other characters without being removed from the keyboard and the touch input has a softer force onset profile than in the first instance, disambiguating the touch input as the shape-writing input and entering a shape writing word identified by the touch input, the shape writing word comprising the starting character and the one or more other characters.

10. The method of claim 9, further comprising:
in the first instance, displaying the menu proximate the starting character.

11. The method of claim 9, further comprising:
in the first instance, displaying the plurality of auxiliary characters above the starting character.

12. The method of claim 9, wherein, in the first instance, the touch input stays in contact with the keyboard after the tap and hold and while moving toward the particular auxiliary character.

13. The method of claim 12, further comprising:
in the first instance, entering the particular auxiliary character responsive to releasing of the touch input.

14. The method of claim 13, further comprising:
in the second instance, entering the shape writing word responsive to releasing of the touch input.

15. A system comprising:
a touch-sensitive display;
a processor; and
a computer-readable storage medium storing executable code that, when executed, causes the processor to:
provide, on the touch-sensitive display, a keyboard having a shape-writing mode and an individual character entry mode that provides for entry of primary characters and auxiliary characters associated with the primary characters;
receive touch inputs directed to the primary characters of the keyboard; and
based at least on respective pressures of the touch inputs, selectively operate the keyboard in the shape-writing mode and the individual character entry mode by disambiguating the touch inputs as shape-writing inputs to enter words having the primary characters in first instances when the touch inputs have relatively soft force onset profiles and as auxiliary character inputs to enter particular auxiliary characters in second instances when the touch inputs have relatively sharp force onset profiles, the particular auxiliary characters being different from, and associated with, corresponding primary characters.

16. The system of claim 15, wherein the executable code, when executed, causes the processor to:
in the first instances, identify multiple characters along paths of the touch inputs; and
enter shape-written words based at least on the multiple characters along the paths.

17. The system of claim 16, wherein the executable code, when executed, causes the processor to:
in third instances, select individual primary characters for entry when the touch inputs indicate tap and release gestures performed on the individual primary characters.

18. The system of claim 16, wherein the executable code, when executed, causes the processor to:
in the second instances, enter the particular auxiliary characters when the touch inputs indicate tap and hold gestures on starting primary characters followed by movement of the touch inputs toward the particular auxiliary characters.

19. The system of claim 18, wherein the executable code, when executed, causes the processor to:
after the tap and hold gestures, display menus identifying a plurality of auxiliary characters associated with the starting primary characters, the movement of the touch inputs identifying the particular auxiliary characters from the displayed menus.

20. The system of claim 19, the particular auxiliary characters including special characters other than letters of the English alphabet.

* * * * *